US011207739B2

(12) United States Patent
Slater

(10) Patent No.: US 11,207,739 B2
(45) Date of Patent: *Dec. 28, 2021

(54) METHODS OF MILLING A PIECE OF RAW STEEL STOCK INTO A MACHINE-READY PIECE OF STEEL

(71) Applicant: Steel 21, LLC, Cedar Springs, MI (US)

(72) Inventor: Kimm Eric Slater, Grand Rapids, MI (US)

(73) Assignee: Steel 21, LLC, Cedar Springs, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,861

(22) Filed: Mar. 4, 2020

(65) Prior Publication Data

US 2020/0198029 A1 Jun. 25, 2020

Related U.S. Application Data

(63) Continuation of application No. 16/561,193, filed on Sep. 5, 2019, now Pat. No. 10,603,727, which is a
(Continued)

(51) Int. Cl.
*B23C 3/13* (2006.01)
*B23D 7/08* (2006.01)
(Continued)

(52) U.S. Cl.
CPC .................. *B23C 3/13* (2013.01); *B23C 3/14* (2013.01); *B23D 7/08* (2013.01); *B23Q 3/154* (2013.01);
(Continued)

(58) Field of Classification Search
CPC ......... B25B 11/02; B25B 11/002; B23Q 3/15; B23Q 3/1543; B23Q 3/1546; B23Q 3/154;
(Continued)

(56) References Cited

U.S. PATENT DOCUMENTS 2,524,232 A 10/1950 Onsrud
2,678,487 A 5/1954 Onsrud
(Continued)

OTHER PUBLICATIONS

Stritzelberger GMBH, Extreme Spannkiall-Magnetspannplatte, YouTube, https://www.youtube.com/watch?v=gfAkVVtifZM&t=7s, Published on Jun. 16, 2015 by Username vakuumtischDE.
(Continued)

*Primary Examiner* — Boyer D Ashley
*Assistant Examiner* — Michael Vitale
(74) *Attorney, Agent, or Firm* — Price Heneveld LLP

(57) ABSTRACT

A method of milling a piece of raw steel stock comprising: arranging a minimum of four solid pole extensions on top surface segments of a magnetic chuck such that the solid pole extensions are relatively evenly distributed under a piece of raw steel stock and within 2 inches of a perimeter of the piece of raw steel stock; arranging multiple mobile pole extensions beneath the piece of raw steel stock and on every other top surface segment of the magnetic chuck under the piece of raw steel stock that is not occupied by the solid pole extensions but beneath the piece of raw steel stock, each of the multiple mobile pole extensions having a biased top portion that contacts the piece of raw steel stock; and milling the piece of raw steel stock with a face mill that generates steel chip as swarf.

23 Claims, 21 Drawing Sheets

Related U.S. Application Data continuation of application No. 15/790,935, filed on Oct. 23, 2017, now Pat. No. 10,449,612.

(60) Provisional application No. 62/411,807, filed on Oct. 24, 2016.

(51) Int. Cl.

| | | |
|---|---|---|
| *B23Q 3/154* | (2006.01) | |
| *B23C 3/14* | (2006.01) | |
| *B25B 11/00* | (2006.01) | |
| *B23C 5/20* | (2006.01) | |
| *B23C 5/06* | (2006.01) | |

(52) U.S. Cl.
CPC ............ *B23C 5/06* (2013.01); *B23C 5/20* (2013.01); *B23C 2270/08* (2013.01); *B23Q 3/1543* (2013.01); *B25B 11/002* (2013.01); *Y10T 279/23* (2015.01)

(58) Field of Classification Search
CPC . Y10T 409/303752; Y10T 409/303808; Y10T 279/23; Y10T 29/5115
USPC .............. 29/30; 269/8, 309, 310; 279/128; 409/131, 132
See application file for complete search history.

(56) References Cited

U.S. PATENT DOCUMENTS

| | | |
|---|---|---|
| 3,336,551 A | 8/1967 | Stead |
| 3,723,928 A | 3/1973 | Blakey et al. |
| 3,854,711 A | 12/1974 | Dong |
| 4,149,708 A | 4/1979 | Fink et al. |
| 4,691,183 A | 9/1987 | Vernikov et al. |
| 4,837,540 A | 6/1989 | Michele et al. |
| 5,364,083 A | 11/1994 | Ross et al. |
| 5,904,096 A | 5/1999 | Fawcett et al. |
| 5,971,379 A | 10/1999 | Leon, Jr. |
| 6,644,637 B1 | 11/2003 | Shen et al. |
| 2004/0047697 A1 | 3/2004 | Cheng |
| 2004/0080087 A1 | 4/2004 | Lin et al. |
| 2004/0165332 A1 | 8/2004 | Beson |
| 2005/0109249 A1 | 5/2005 | Shen et al. |
| 2005/0269758 A1 | 12/2005 | Sears et al. |
| 2006/0174713 A1 | 8/2006 | Lin et al. |
| 2008/0084012 A1 | 4/2008 | Matlack et al. |
| 2009/0140482 A1 | 6/2009 | Saberton et al. |
| 2010/0019428 A1 | 1/2010 | Sandmeier |
| 2010/0187735 A1 | 7/2010 | Cardone et al. |
| 2010/0189524 A1 | 7/2010 | Yin |
| 2011/0037547 A1 | 2/2011 | Cardone et al. |
| 2011/0043310 A1 | 2/2011 | Cardone et al. |
| 2011/0248435 A1 | 10/2011 | Cosmai et al. |
| 2014/0008853 A1 | 1/2014 | Innocente et al. |
| 2014/0263216 A1 | 9/2014 | Clark |
| 2016/0176003 A1 | 6/2016 | Reckevicius et al. |

OTHER PUBLICATIONS

Stritzelberger GMBH, Extreme Spannkraft-Magnetspannplatte, YouTube, https://www.youtube.com/watch?v=gfAkVVtifZM&t=7s, Published on Jun. 16, 2015 by Username vakuumtischDE.

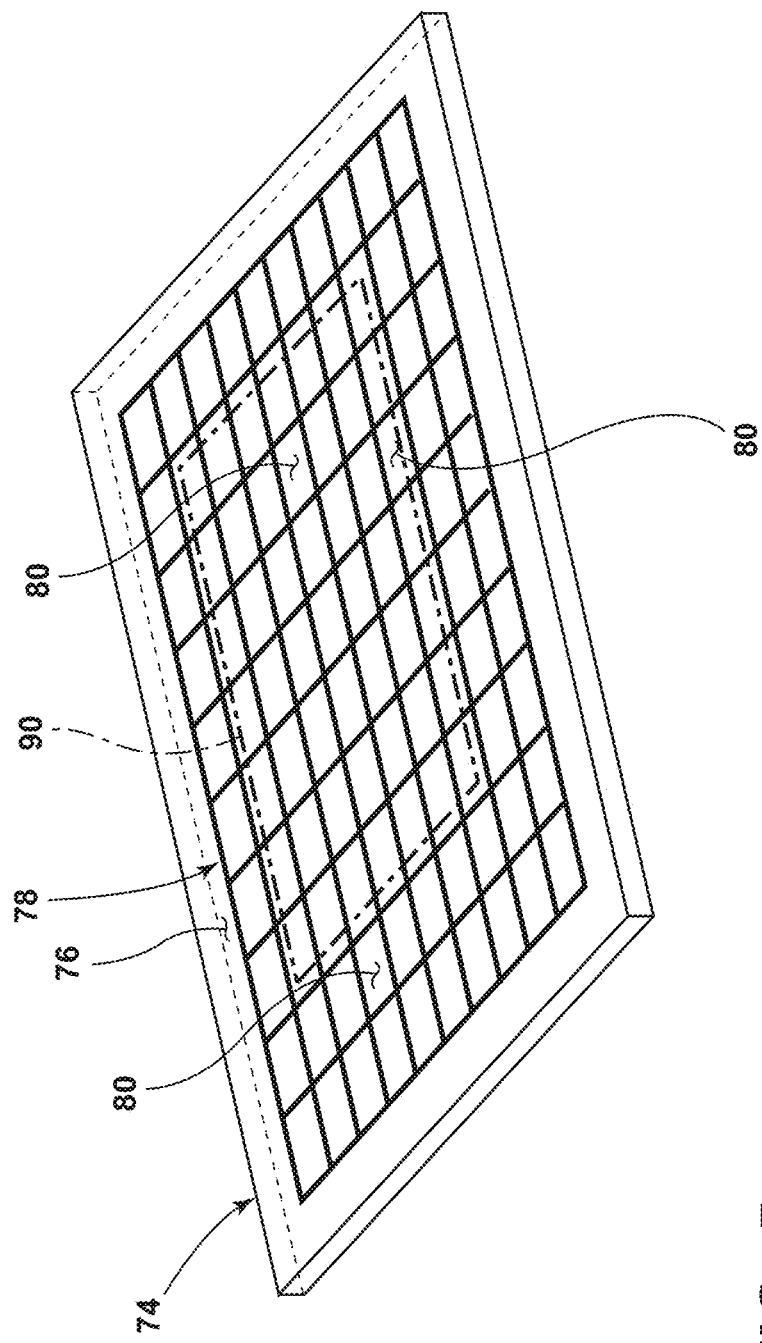

METHODS OF MILLING A PIECE OF RAW STEEL STOCK INTO A MACHINE-READY PIECE OF STEEL

CROSS-REFERENCE TO RELATED APPLICATIONS

This application is a continuation of and claims priority to U.S. patent application Ser. No. 16/561,193 (now U.S. Pat. No. 10,603,727), filed Sep. 5, 2019, entitled "METHODS OF MILLING A PIECE OF RAW STEEL STOCK INTO A MACHINE-READY PIECE OF STEEL, which is a continuation of U.S. patent application Ser. No. 15/790,935 (now U.S. Pat. No. 10,449,612), filed Oct. 23, 2017, entitled "METHODS OF MILLING A PIECE OF RAW STEEL STOCK INTO A MACHINE-READY PIECE OF STEEL," which claims priority to and the benefit under 35 U.S.C. § 119(e) of U.S. Provisional Application No. 62/411,807, filed Oct. 24, 2016, entitled "METHOD OF MACHINING FLAT, PARALLEL-SURFACED PLATE," the disclosures of which are hereby incorporated herein by reference in their entirety.

BACKGROUND OF THE DISCLOSURE

A piece of raw steel stock typically is not ready to be machined. The sides of the piece of raw steel stock are generally not flat enough nor sufficiently parallel. Therefore, the sides of the piece of raw steel stock are ground down to become flat and parallel within specified tolerances.

Conventional methods of transforming a piece of raw steel stock down to a flat machine-ready piece suffer from many disadvantages. The conventional methods typically include grinding, which uses ceramic and other abrasives. The grinding creates friction and thus heat, which warps the piece of steel stock. To counteract the heat and resulting warpage, the steel stock is flooded with coolant. The ground steel, the ceramic, and coolant combine into a toxic swarf and requires disposal in landfills. These grinding methods thus produce too much undesirable environmental waste, resulting in millions of tons of toxic waste being disposed in landfills. Further, conventional methods take too long and are too expensive.

SUMMARY OF THE DISCLOSURE

The inventor has discovered novel methods of milling a piece of raw steel stock into a machine-ready piece of steel, depending on the size and shape of the piece of raw steel stock. The novel methods do not produce environmental waste, are much quicker than conventional grinding methods, and can produce machine-ready pieces of steel within much tighter tolerance levels in terms of flatness and parallel-ness than the conventional grinding methods.

According to a first aspect of the disclosure, a method of milling a piece of raw steel stock into a machine-ready piece of steel and recycling swarf generated from the milling comprises: arranging a minimum of four solid pole extensions on top surface segments of a magnetic chuck such that the solid pole extensions are relatively evenly distributed under a piece of raw steel stock and within 2 inches of a perimeter of the piece of raw steel stock, the piece of raw steel stock having a length of at least 36 inches, a width of at least 36 inches, and a thickness of at least ½ inch, and a first surface and a second surface that are approximately flat and parallel; arranging multiple mobile pole extensions beneath the piece of raw steel stock and on every other top surface segment of the magnetic chuck under the piece of raw steel stock that is not occupied by the solid pole extensions but beneath the piece of raw steel stock, each of the multiple mobile pole extensions having a biased top portion that contacts the piece of raw steel stock; activating magnetic capabilities of the magnetic chuck such that the top portions of each of the mobile pole extensions lock into place supporting the piece of raw steel stock; milling the first surface of the piece of raw steel stock with a face mill that includes spaces to hold multiple cutting inserts but holds only one carbide cutting insert, the one carbide cutting insert generating swarf from the piece of raw steel stock that consists essentially of steel chip; and recycling the steel chip.

The first aspect of the disclosure can further include any one or more of the following features:

flipping the piece of raw steel stock over and milling the second surface of the piece of raw steel stock with the face mill that holds only the one carbide cutting insert;

continuing flipping the piece of raw steel stock over and milling whichever of the first surface and the second surface of the piece of the raw steel stock is available for milling until both the first surface and the second surface have an arithmetic mean surface roughness ("Ra") of 21 micrometers or less, and the first surface and the second surface are parallel to within a tolerance of at least of 0.001 inch per 36 inches;

milling of the piece of raw steel stock does not include the use of coolant, and the generated swarf does not comprise coolant;

before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under an upward bow of the piece of raw steel stock;

before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that an additional solid pole extension is disposed under every protrusion at least five inches in length protruding from a side of the piece of raw steel stock; and before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under the piece of raw steel stock between a pair of holes extending through the piece of raw steel stock.

According to a second aspect of the disclosure, a method of milling a piece of raw steel stock into a machine-ready piece of steel comprises: arranging a minimum of four solid pole extensions on top surface segments of a magnetic chuck such that the solid pole extensions are relatively evenly distributed under a piece of raw steel stock and within 2 inches of a perimeter of the piece of raw steel stock, the piece of raw steel stock having a length of at least 36 inches, a width of at least 36 inches, and a thickness of at least ½ inch, and a first surface and a second surface that are approximately flat and parallel; arranging multiple mobile pole extensions beneath the piece of raw steel stock and on every other top surface segment of the magnetic chuck under the piece of raw steel stock that is not occupied by the solid pole extensions but beneath the piece of raw steel stock, each of the multiple mobile pole extensions having a biased top portion that contacts the piece of raw steel stock; activating magnetic capabilities of the magnetic chuck such that the top portions of each of the mobile pole extensions lock into place supporting the piece of raw steel stock; milling the first surface of the piece of raw steel stock with a face mill that includes spaces to hold multiple cutting inserts but holds only one carbide cutting insert; flipping the piece of raw steel stock over and milling the second surface of the piece of raw steel stock with the face mill that holds only the one carbide cutting insert; and continuing flipping the piece of raw steel stock over and milling whichever of the first surface and the second surface of the piece of the raw steel stock is available for milling until both the first surface and the second surface have an arithmetic mean surface roughness ("Ra") of 21 micrometers or less, and the first surface and the second surface are parallel to within a tolerance of at least of 0.001 inch per 36 inches.

The second aspect of the disclosure can further include any one or more of the following features:

recycling swarf consisting of a steel chip that the one carbide cutting insert generates while milling the piece of raw steel stock;
  milling of the piece of raw steel stock does not include the use of coolant, and swarf generated from the milling does not comprise coolant;
  before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under an upward bow of the piece of raw steel stock;
  before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under a protrusion at least five inches in length protruding from a side of the piece of raw steel stock; and
  before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under the piece of raw steel stock between a pair of holes extending through the piece of raw steel stock.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 5 is a perspective view of the magnetic chuck of FIG. 2 further illustrating an area of the top surface of the magnetic chuck on which the second surface of the piece of raw steel stock of FIGS. 1A and 1B will be supported for milling the first surface thereof;

DETAILED DESCRIPTION

For purposes of description herein, the terms "under" and "beneath" and derivatives thereof shall relate to the disclosure as oriented in FIGS. 8, 9, 12B, 16, and 20. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
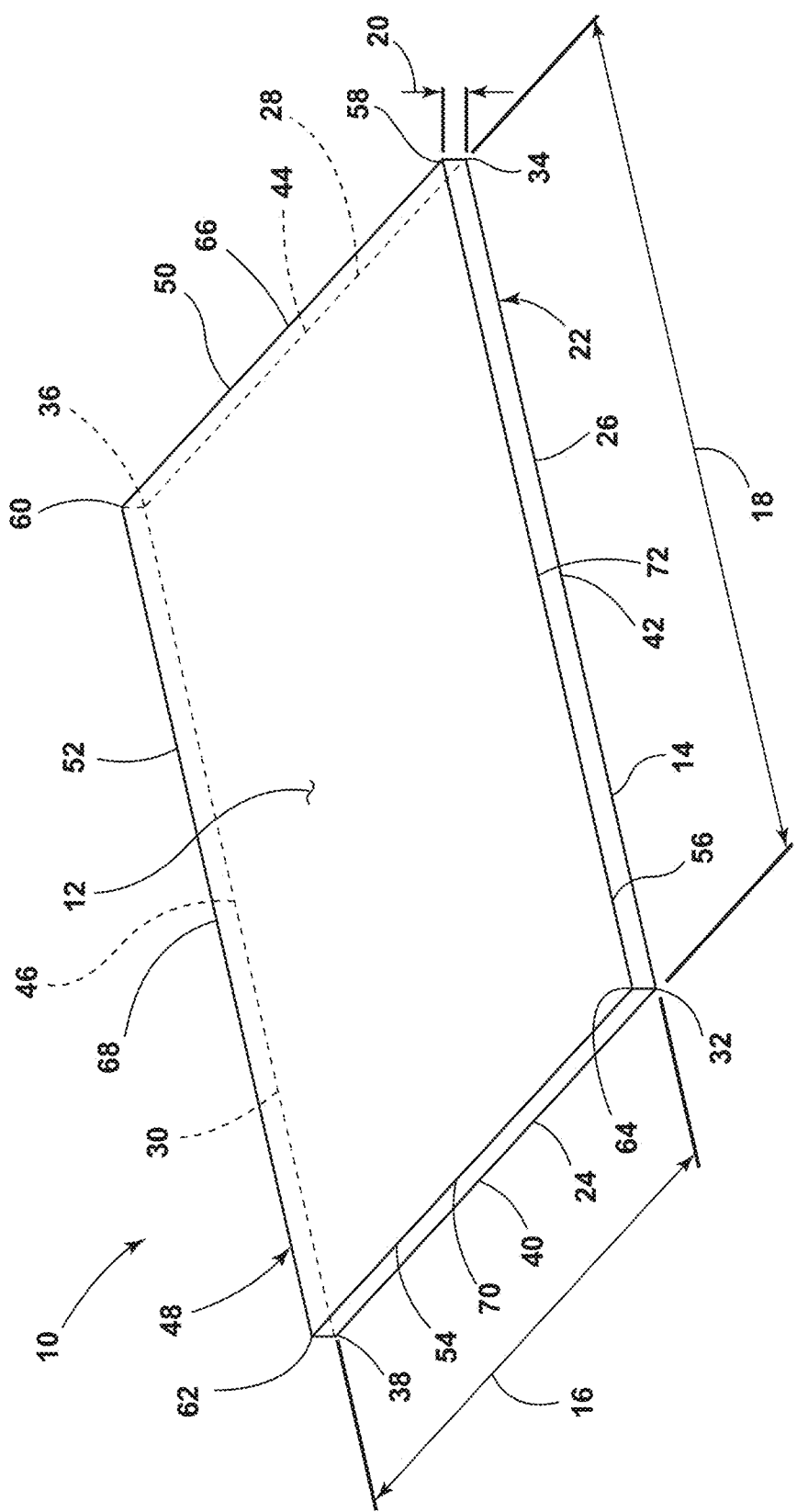
FIG. 1A is a perspective view of a first embodiment of a piece of raw steel stock, illustrating a first surface including edges forming corners and a perimeter.
Figure 1B:
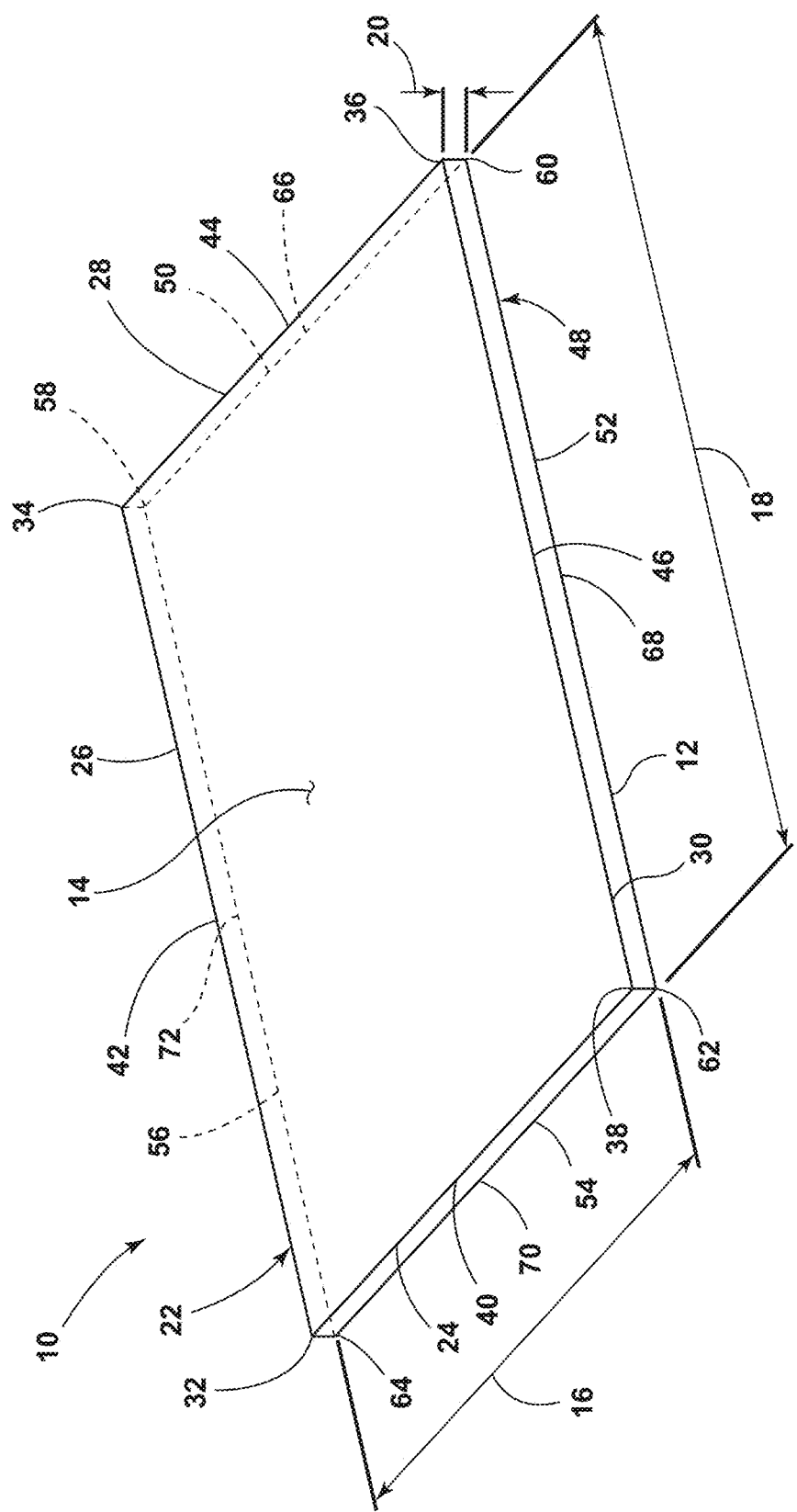
FIG. 1B is a perspective view of the first embodiment of a piece of raw steel stock, illustrating a second surface including edges forming corners and a perimeter.

Referring now to FIGS. 1A and 1B, a piece of raw steel stock 10 has a first surface 12 and a second surface 14. The second surface 14 is on the opposite side of the piece of raw steel stock 10 as the first surface 12. The piece of raw steel stock 10 is typically a slab of steel with the first surface 12 and the second surface 14 that are approximately flat and parallel but not within acceptable tolerances for machining purposes. A process of milling the piece of raw steel stock 10 described herein will transform the piece of raw steel stock 10 into a machine-ready piece of steel, and is advantageous over conventional grinding processes to transform the piece of raw steel stock 10 into a machine-ready piece of steel. The piece of raw steel stock 10 has a width 16 of at least 36 inches, a length 18 of at least 36 inches, and thickness 20 of between ½inch and 12 inches or more. The second surface 14 of the piece of raw steel stock 10 further includes a perimeter 22, which can be defined by edges 24, 26, 28, 30. The edges 24, 26, 28, 30 form corners 32, 34, 36, 38. The edges 24, 26, 28, 30 have centers 40, 42, 44, 46 respectively. In general terms, the perimeter 22 of the second surface 14 is the boundary of the second surface 14 that would be supported for milling of the first surface 12 as discussed below. The first surface 12 of the piece of raw steel stock 10 likewise includes a perimeter 48, which can be defined by edges 50, 52, 54, 56. The edges 50, 52, 54, 56 form corners 58, 60, 62, 64. The edges 50, 52, 54, 56 have centers 66, 68, 70, 72 respectively.

Figure 2:
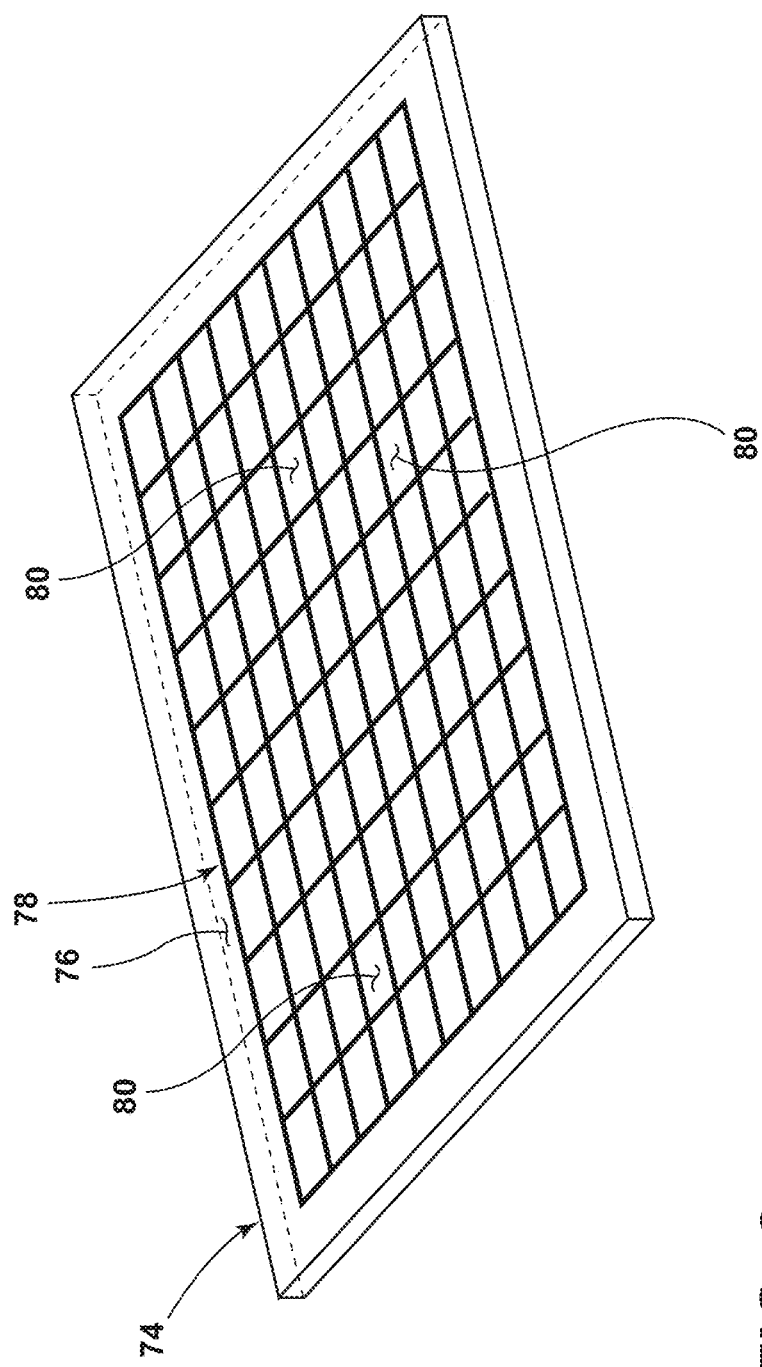
FIG. 2 is a perspective view of a magnetic chuck to secure the piece of raw steel stock of FIGS. 1A and 1B for milling, illustrating a grid of top surface segments.

Referring now to FIG. 2, a magnetic chuck 74 to magnetically secure the piece of raw steel stock 10 for milling is illustrated. The magnetic chuck 74 includes a top surface 76. The top surface 76 of the magnetic chuck 74 can, as illustrated, include a grid 78 with rows and columns forming top surface segments 80. The grid 78 of course could include more or less top surface segments 80 than that illustrated in FIG. 2. The top surface segments 80 are flat and level and planar with each other, forming a flat and level top surface 76, which is thus configured to support the piece of raw steel stock 10 for milling. When magnetic capabilities of the magnetic chuck 74 are activated, magnetic forces maintain any metal piece in magnetic communication with the top surface 76 at the metal piece's position thereon, as discussed further below. The magnetic chuck 74 therefore can be utilized to maintain the piece of raw steel stock 10 in a static position during a milling process to transform the piece of raw steel stock 10 into a machine-ready piece of steel.

Figure 3:
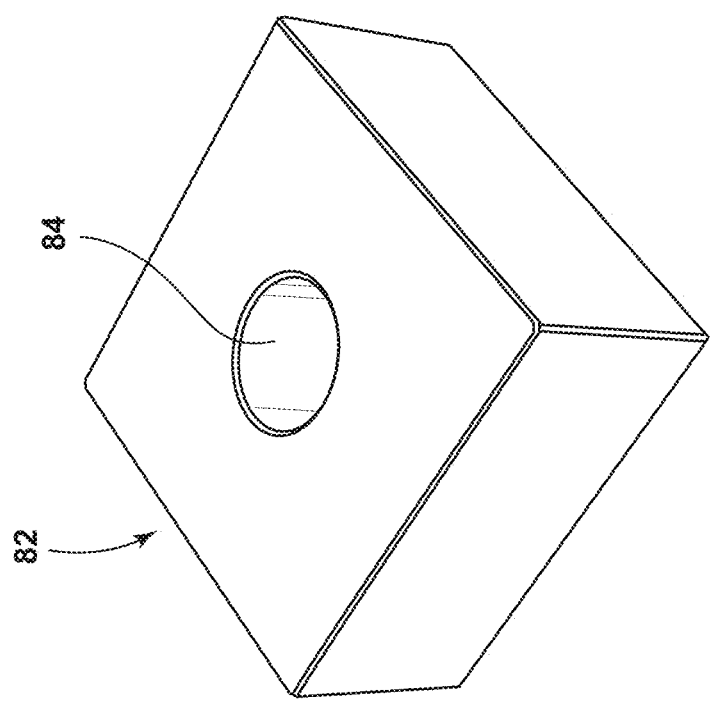
FIG. 3 is a perspective view of a solid pole extension, which can be placed on a top surface segment of the magnetic chuck of FIG. 2 to support the piece of raw steel stock of FIGS. 1A and 1B for milling.

Referring now to FIG. 3, one or more solid pole extensions 82 can be utilized with the magnetic chuck 74 while performing the milling process on the piece of raw steel stock 10. Each solid pole extension 82 is sized to be placed on a top surface segment 80 of the magnetic chuck 74. More particularly, each solid pole extension 82 can be a cube or other three-dimensional piece of metal with a central aperture 84 to allow a fastener to fasten the solid pole extension 82 to a top surface segment 80 of the magnetic chuck 74. The one or more solid pole extensions 82 can be placed on the top surface 76 of the magnetic chuck 74 to support the piece of raw steel stock 10 and to separate the top surface 76 of the magnetic chuck 74 from the piece of raw steel stock 10 during the milling operation of the piece of raw steel stock 10. Each solid pole extension 82, as mentioned, is metal and thus transfers the magnetic forces from the magnetic chuck 74 to the piece of raw steel stock 10.

Figure 4:
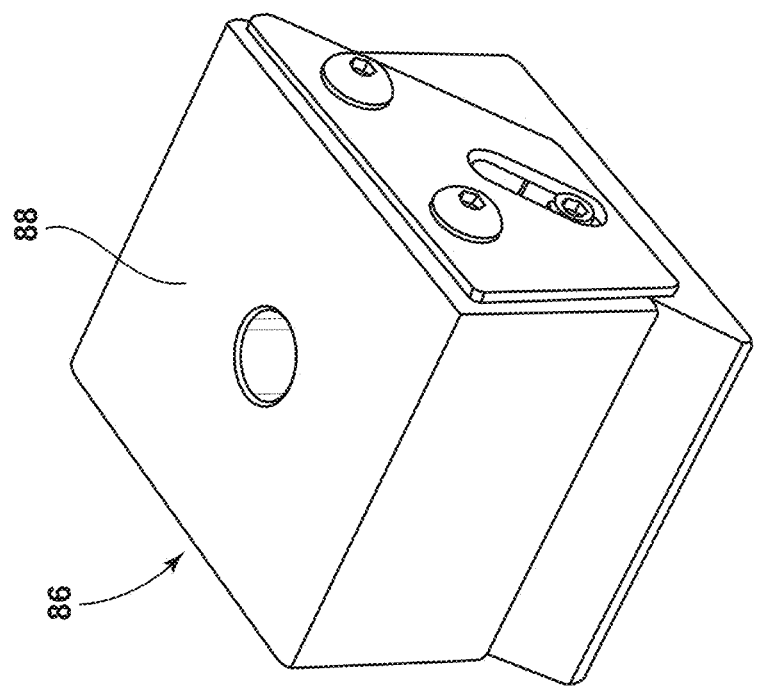
FIG. 4 is a perspective view of a mobile pole extension, which can be placed on a top surface segment of the magnetic chuck of FIG. 2 to further support the piece of raw steel stock of FIGS. 1A and 1B for milling.

Referring to FIG. 4, one or more mobile pole extensions 86 can be utilized with the magnetic chuck 74 and the one or more solid pole extensions 82 while performing the milling process on the piece of raw steel stock 10. The mobile pole extension 86 is sized to be placed on a top surface segment 80 of the magnetic chuck 74. An internal spring (not illustrated) biases the top portion 88 of the mobile pole extension 86 away from the top surface segment 80 of the magnetic chuck 74 on which the mobile pole extension 86 is placed. Therefore, when the piece of raw steel stock 10 is placed, with the second surface 14 toward the top surface 76 of the magnetic chuck 74, on both one or more solid pole extensions 82 and one or more mobile pole extensions 86, the solid pole extensions 82 support the piece of raw steel stock 10 over the top surface 76 of the magnetic chuck 74 and the spring of each of the one or more mobile pole extensions 86 biases the top portion 88 of each mobile pole extension 86 to contact the second surface 14 of the piece of raw steel stock 10. When the magnetic capabilities of the magnetic chuck 74 are activated, the position of the top portion 88 of each of the mobile pole extensions 86 lock into place, further supporting the piece of raw steel stock 10 but matching the contour of the second surface 14 of the piece of raw steel stock 10. The mobile pole extensions 86 help prevent the magnetic chuck 74 from fully counteracting any natural warp in the piece of raw steel stock 10.

As further described herein, the magnetic chuck 74, the one or more solid pole extensions 82, and one or more mobile pole extensions 86 are utilized in a novel method to grind the piece of raw steel stock 10 into a machine-ready piece of steel. The method includes determining where, on the top surface 76 of the magnetic chuck 74, the second surface 14 of the piece of raw steel stock 10 will be supported for milling of the first surface 12 of the piece of raw steel stock 10. Referring now to FIG. 5, an area 90 on the top surface 76 of the magnetic chuck 74 corresponding to the perimeter 22 of the second surface 14 of the piece of raw steel stock 10 is illustrated. Area 90 is, thus, where the second surface 14 of the piece of raw steel stock 10 can be supported for milling of the first surface 12 of the piece of raw steel stock 10. A differently shaped perimeter 22 would, of course, result in a differently shaped area 90.

Figure 6:
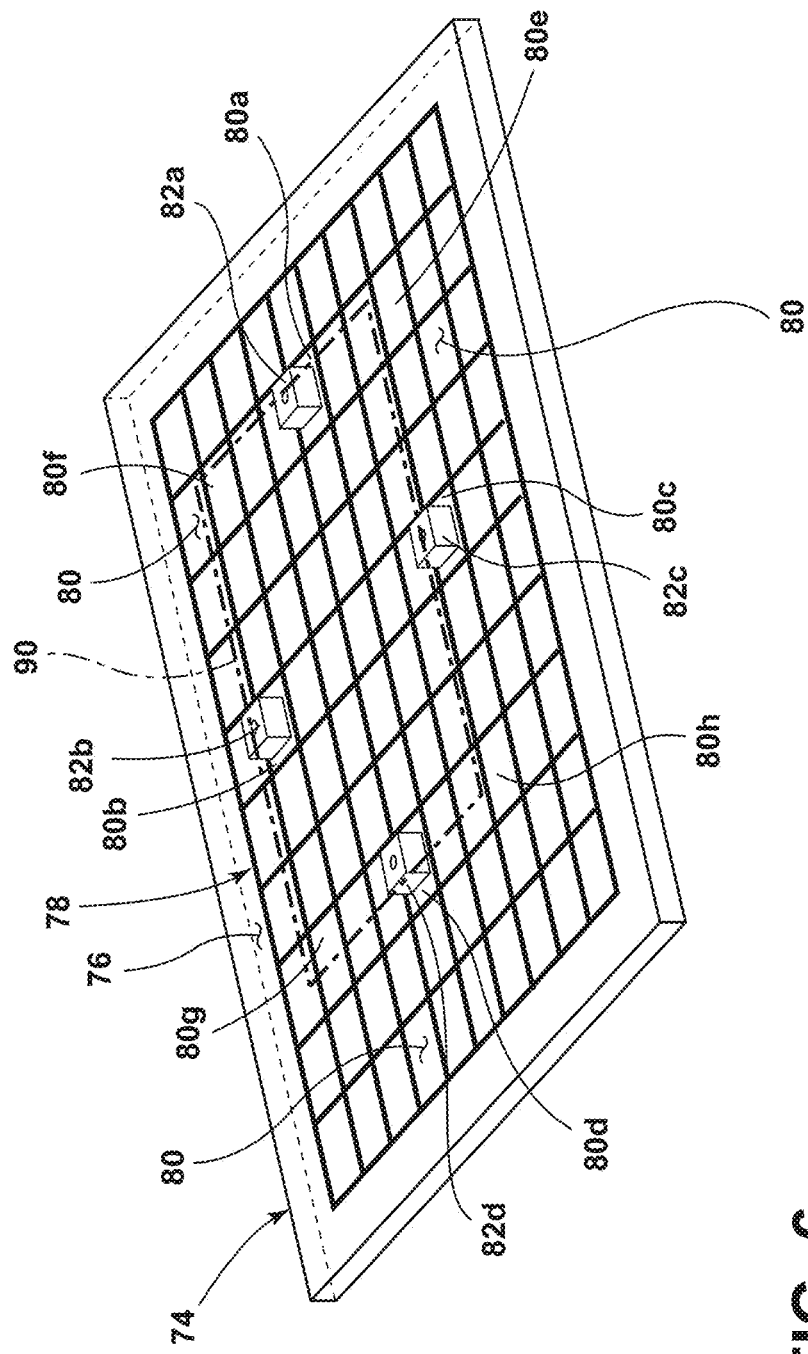
FIG. 6 is a perspective view of the magnetic chuck of FIG. 2 further illustrating solid pole extensions relatively evenly distributed on the top surface to support the perimeter of the second surface of the piece of raw steel stock of FIGS. 1A and 1B for milling the first surface thereof.

The method further includes arranging a minimum of four solid pole extensions 82 on the magnetic chuck 74 where (e.g., in the area 90) the second surface 14 of the piece of raw steel stock 10 will be supported for milling of the first surface 12 thereof such that the solid pole extensions 82 will be relatively evenly distributed under the perimeter 22 of the second surface 14 of the piece of raw steel stock 10 and within 2 inches of the perimeter 22. Referring now to FIG. 6, the area 90 of the top surface 76 of the magnetic chuck 74 corresponding to the perimeter 22 of the second surface 14 of the piece of raw steel stock 10 is identified. Four solid pole extensions 82a-82d are placed on top surface segments 80a-80d respectively of the magnetic chuck 74. The four solid pole extensions 82a-82d are placed at the top surface segments 80a-80d that overlap with the perimeter 22 of the second surface 14 of the piece of the raw steel stock 10. The four solid pole extensions 82a-82d are relatively evenly distributed around the area 90 and thus under the perimeter 22 of the second surface 14, with solid pole extensions 82a-82d being placed to support approximately the centers 40, 42, 44, 46 of the edges 24, 26, 28, 30, respectively, of the second surface 14 of the piece of raw steel stock 10. The four solid pole extensions 82a-82d could alternatively be arranged to support the corners 32, 34, 36, 38 of the second surface 14 of the piece of raw steel stock 10, such as at top surface segments 80e-80h of the magnetic chuck 74.

Figure 7:
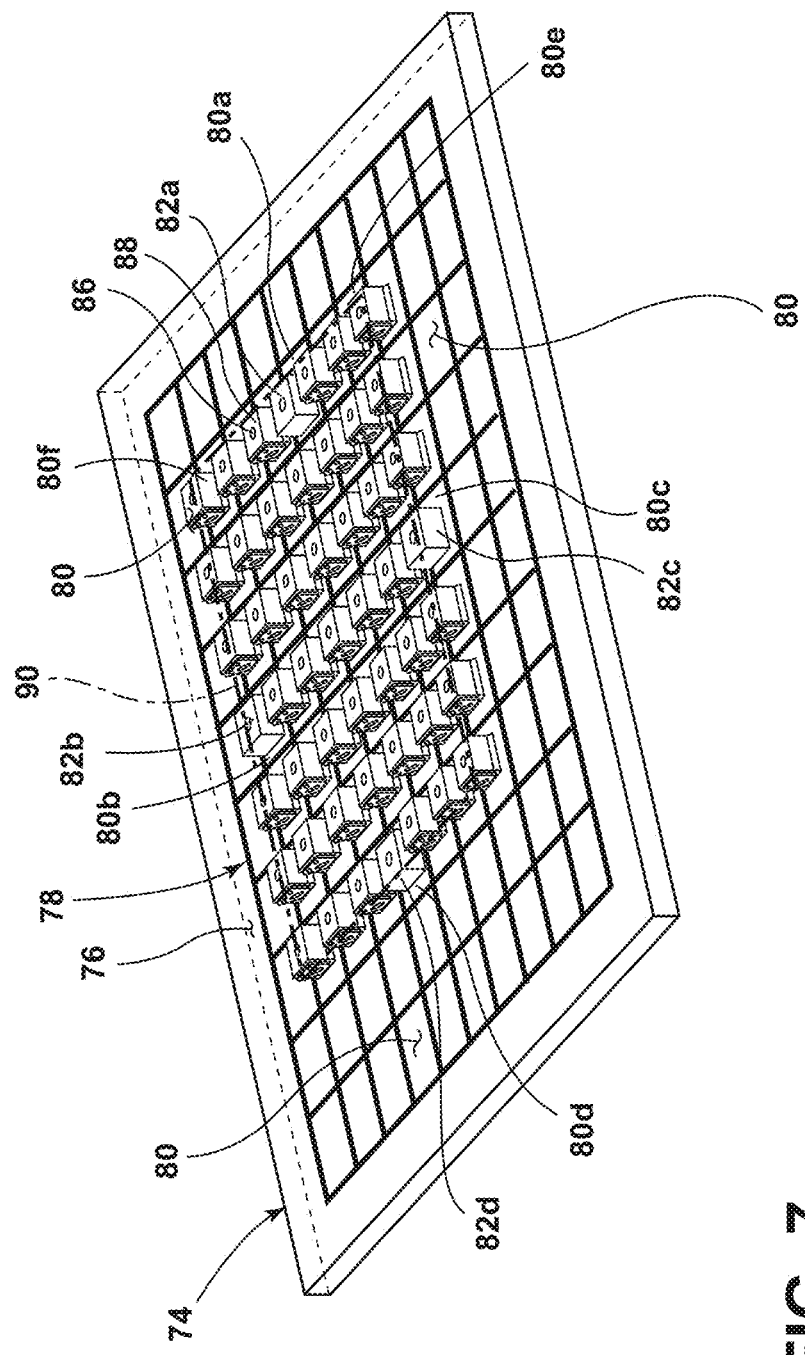
FIG. 7 is a perspective view of the magnetic chuck of FIG. 2 further illustrating mobile pole extensions arranged on every other available top surface segment within the area corresponding to the perimeter of the second surface of the piece of raw steel stock of FIGS. 1A and 1B.

The method further includes arranging multiple mobile pole extensions 86 between the top surface 76 and where the second surface 14 of the piece of raw steel stock 10 will be supported for milling of the first surface 12 (i.e., area 90). Referring now to FIG. 7, mobile pole extensions 86 are positioned on top surface segments 80 of the magnetic chuck 74. Every top surface segment 80 within the area 90 corresponding to the perimeter 22 of the second surface 14 that is not occupied by a solid pole extension 82 (such as solid pole extensions 82a-82d) can be occupied by a mobile pole extension 86, as illustrated.

Figure 8:
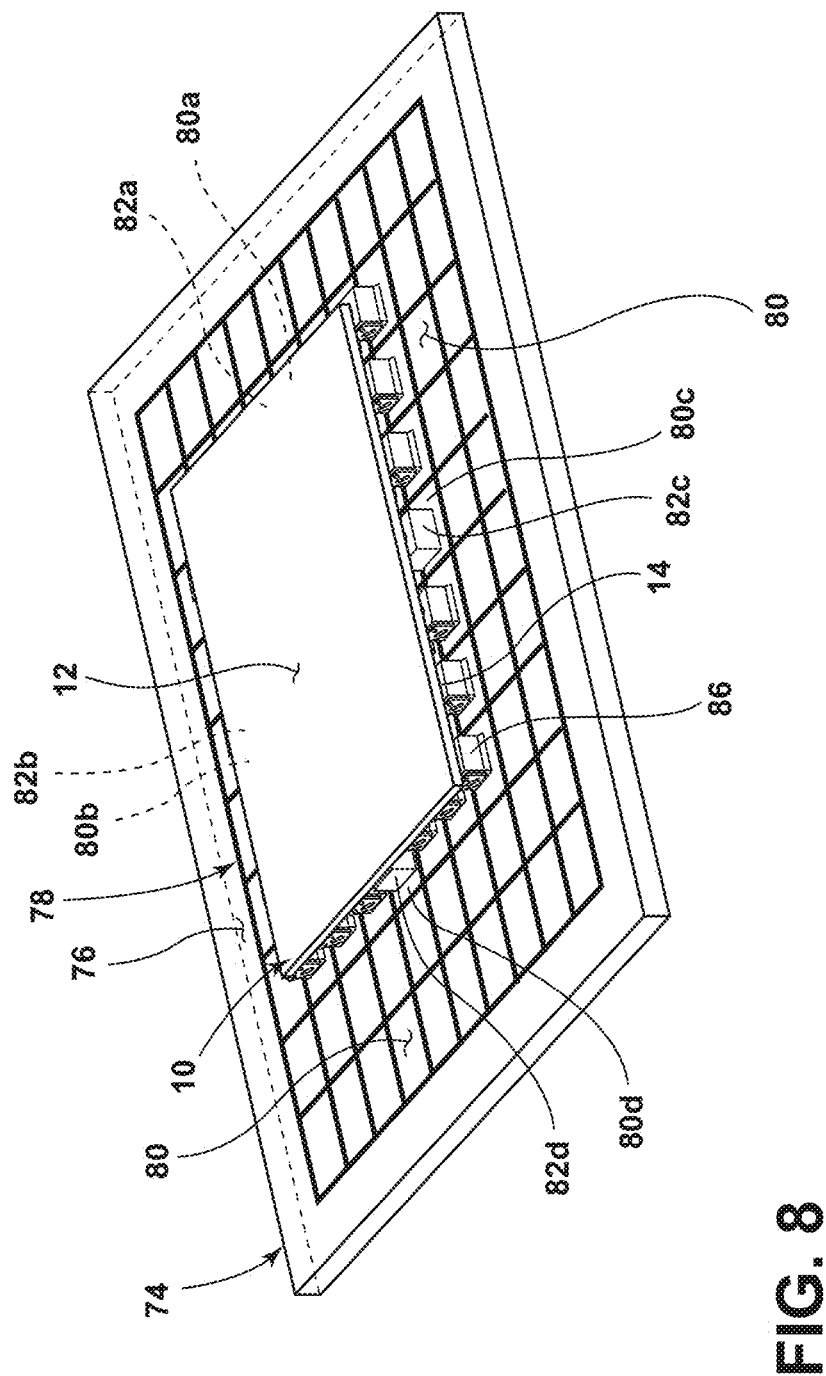
FIG. 8 is a perspective view of the magnetic chuck of FIG. 2 and the solid pole extensions and mobile pole extensions supporting the second surface of the piece of raw steel stock of FIGS. 1A and 1B for milling of the first surface thereof.

The method further includes placing the second surface 14 of the piece of raw steel stock 10 onto the multiple mobile pole extensions 86 and the solid pole extensions 82a-82d. Referring now to FIG. 8, the second surface 14 of the piece of raw steel stock 10 is over the top surface 76 of the magnetic chuck 74, supported by the solid pole extensions 82a-82d. As mentioned above, the spring in each of the mobile pole extensions 86 biases the top portion 88 of each of the mobile pole extensions 86 to contact the second surface 14 of the piece of raw steel stock 10. After the magnetic capabilities of the magnetic chuck 74 are activated, the top portion 88 of each of the mobile pole extensions 86 locks into place and further supports the second surface 14 of the piece of raw steel stock 10.

Figure 9:
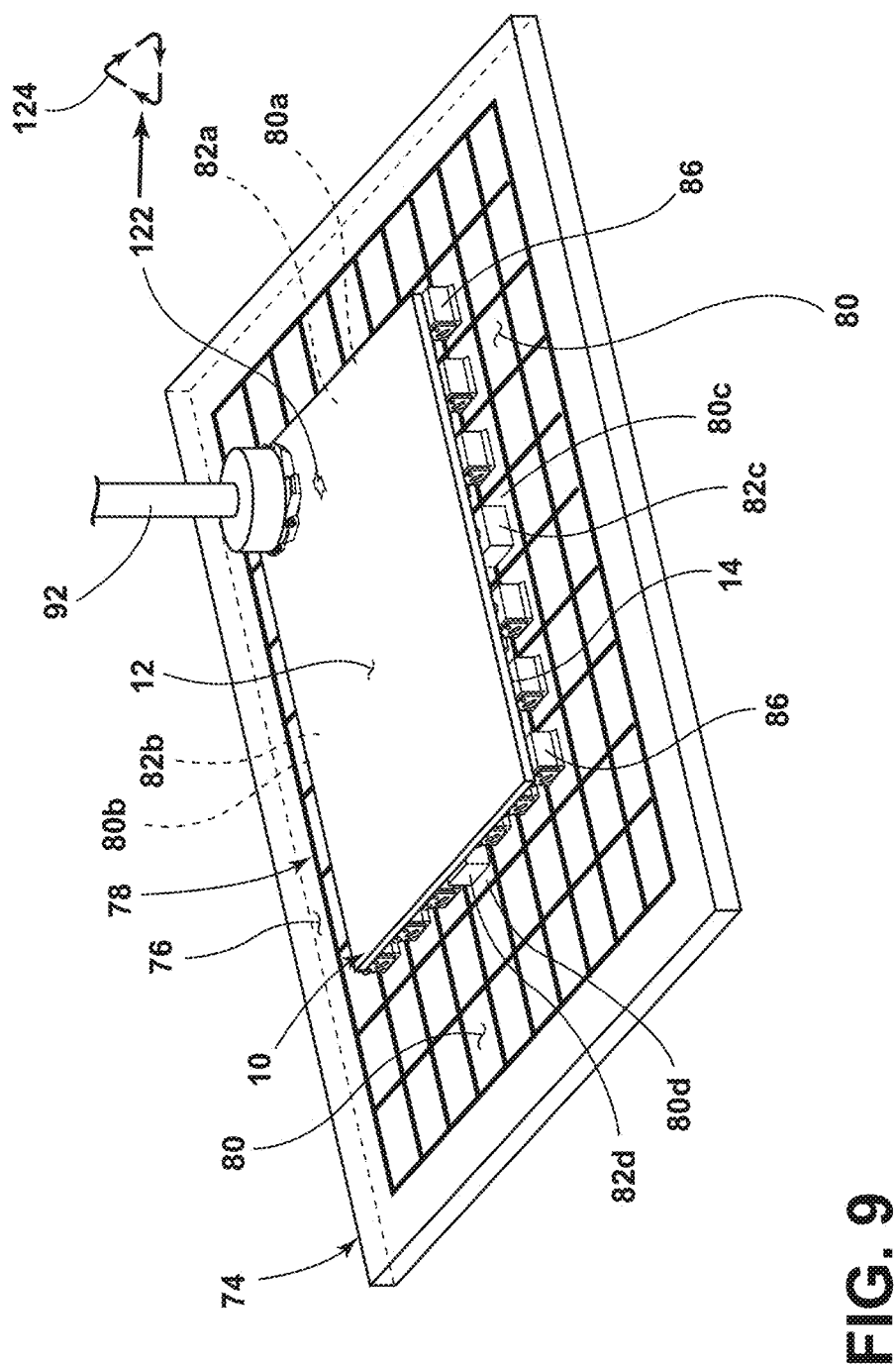
FIG. 9 is a perspective view of a milling element milling the first surface of the piece of raw steel stock of FIGS. 1A and 1B, while being supported as illustrated in FIG. 8.
Figure 10:
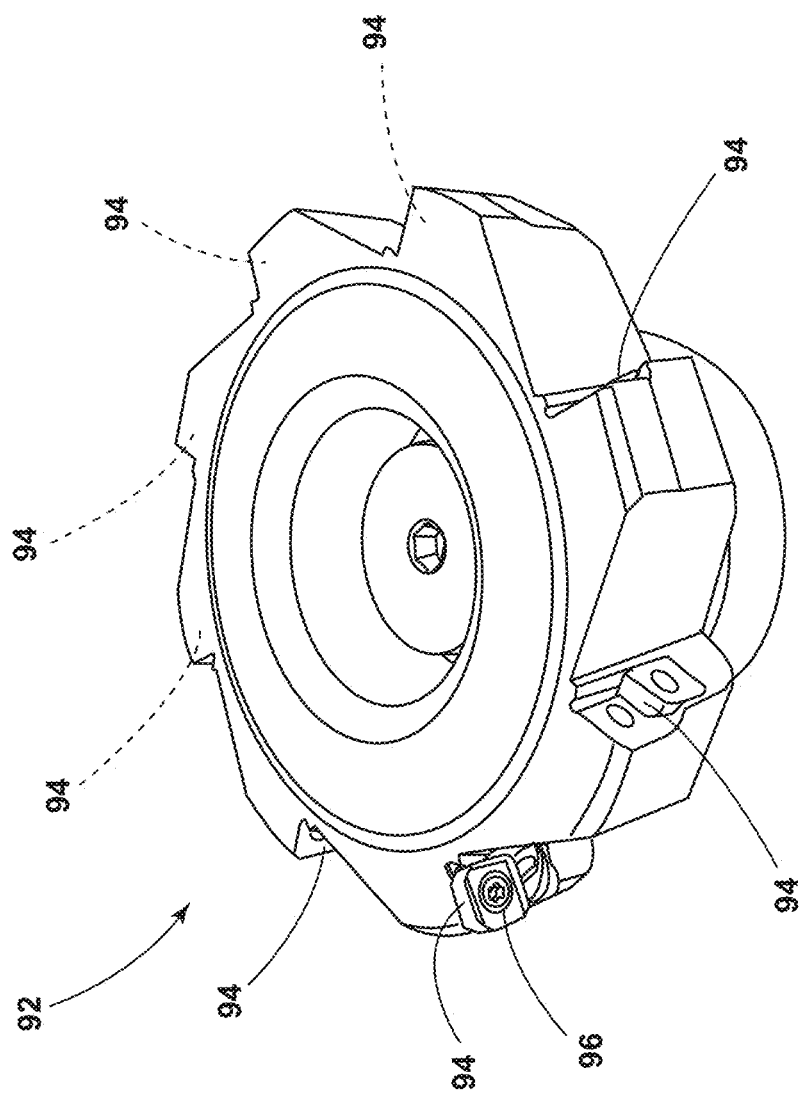
FIG. 10 is a perspective view of the bottom of the milling element of FIG. 9, illustrating numerous spaces to hold a cutting insert but only including one cutting insert.

The method further includes activating the magnetic capabilities of the magnetic chuck 74. Because of the magnetic forces that the magnetic chuck 74 provides, the piece of raw steel stock 10 is maintained in place for milling. The method further includes milling the first surface 12 of the piece of raw steel stock 10 to a desired flatness. Referring now to FIG. 9, a milling element 92 mills the first surface 12. A preferred milling element 92 is a face mill, which is illustrated as the milling element 92 in FIGS. 9 and 10. Referring to FIG. 10, the milling element 92 (here, a face mill) includes spaces 94 to hold cutting inserts 96. The milling element 92 preferably includes only one cutting insert 96, which can be a carbide cutting insert. However, the milling element 92 could include multiple cutting inserts 96, such as multiple carbide cutting inserts. The milling element 92 can mill the first surface 12 of the piece of raw steel stock 10 until the first surface 12 has an arithmetic mean surface roughness ("Ra") of 21 micrometers or less. The Ra value can be determined by a profilometer, as known in the art. Further, the milling element 92 can mill the first surface 12 of the piece of raw steel stock 10 to a flat surface within a tolerance of 0.001 inch per 36 inches.

Figure 11:
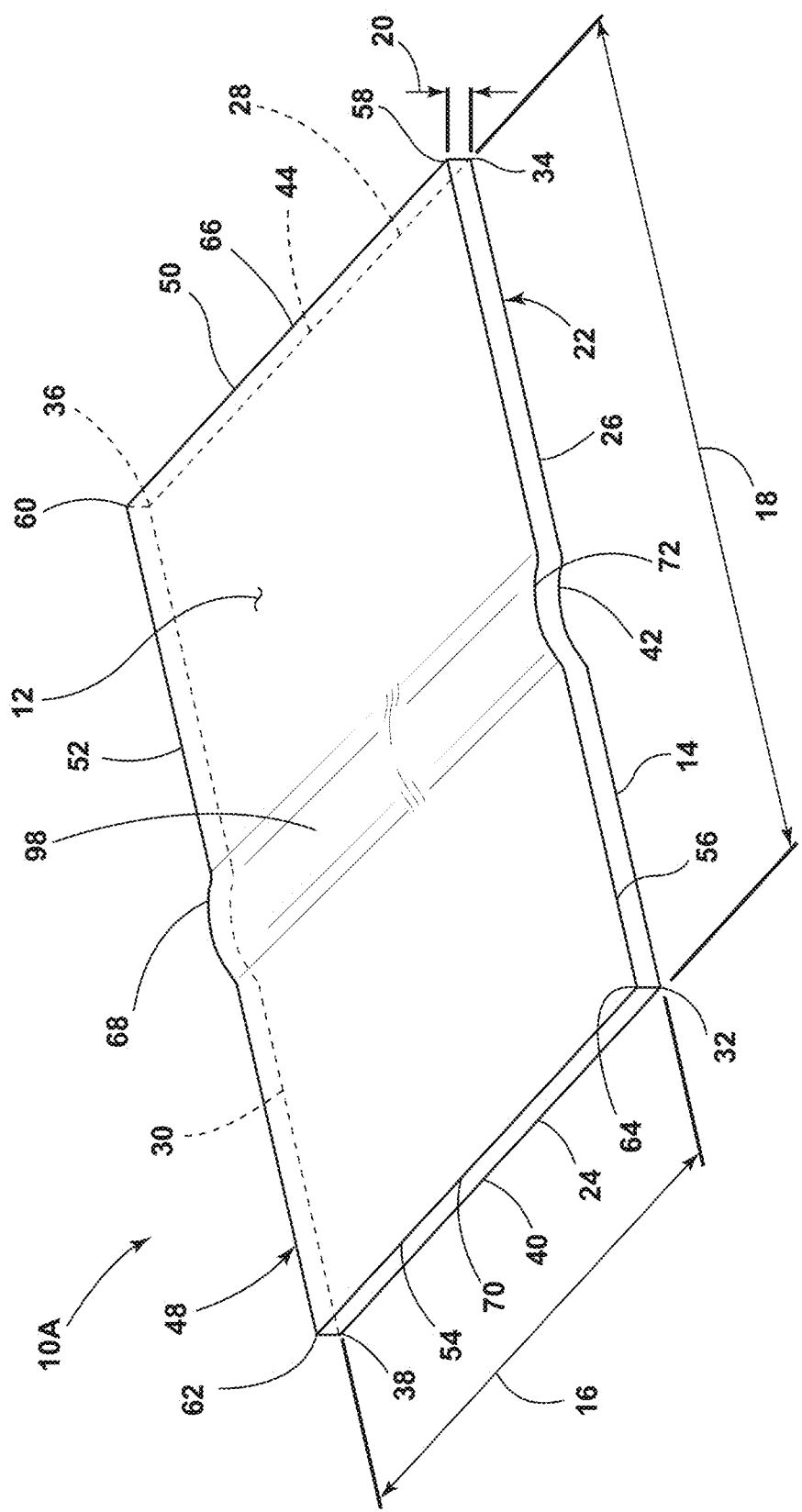
FIG. 11 is a perspective view of another piece of raw steel stock, otherwise identical to the piece of raw steel stock of FIGS. 1A and 1B, but further including a bow.
Figure 12A:
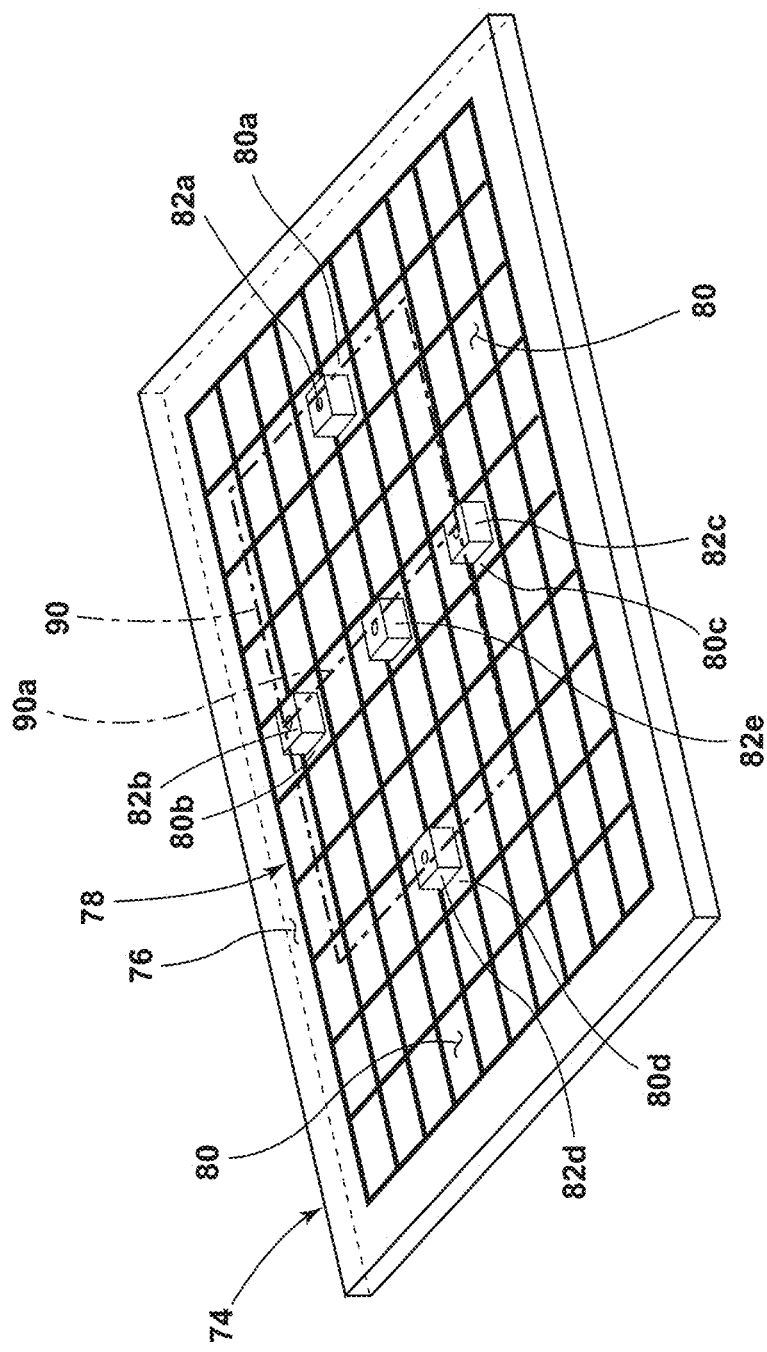
FIG. 12A is a perspective view of the magnetic chuck of FIG. 2, illustrating an area corresponding to a perimeter of a second surface of the piece of raw steel stock of FIG. 11 including an element identifying where the bow will be supported and relatively evenly distributed solid pole extensions including a solid pole extension dedicated to support the bow.
Figure 12B:
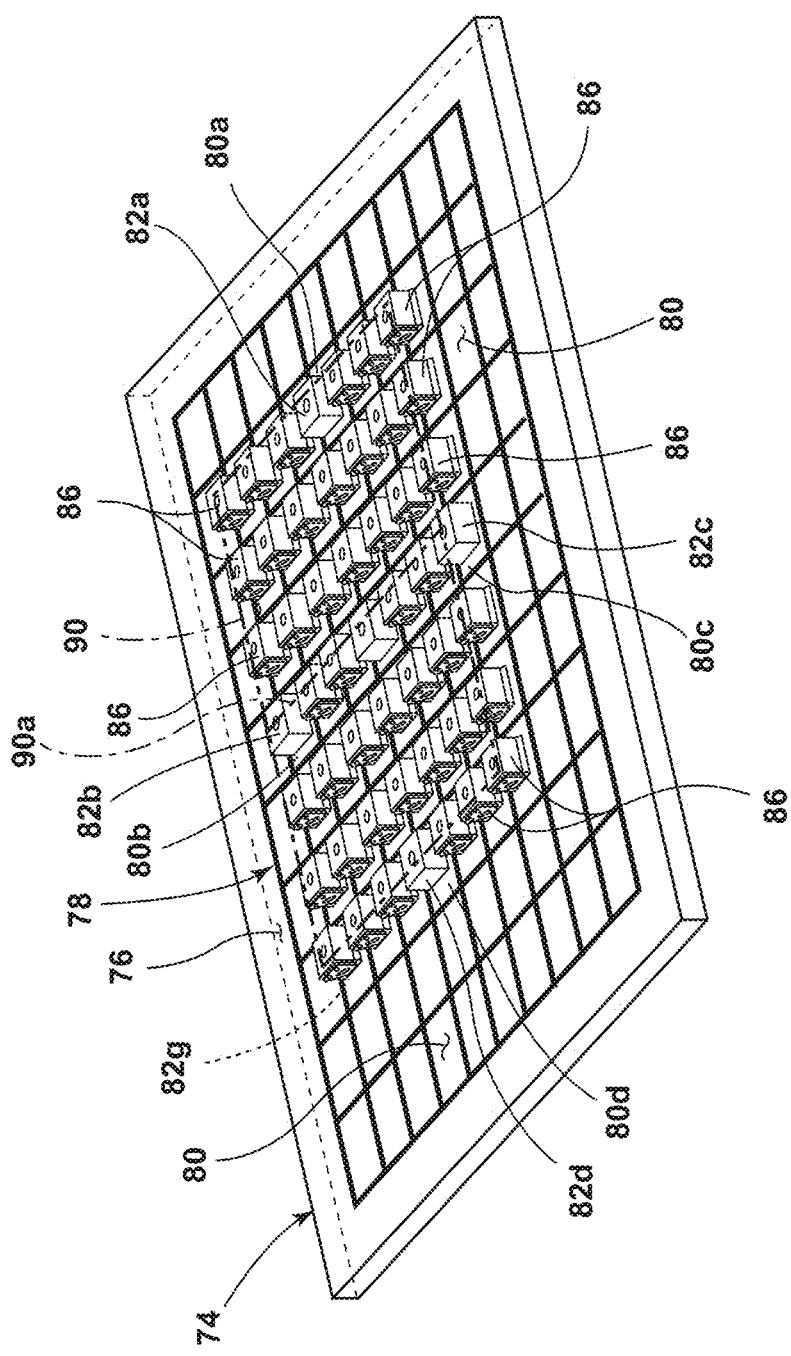
FIG. 12B is a perspective view of FIG. 12A but also illustrating mobile pole extensions occupying very other available top surface segment within the area.

Referring now to FIG. 11, another piece of raw steel stock 10A, which is otherwise identical to the piece of raw steel stock 10 of FIG. 1, includes a bow 98. The bow 98 illustrated is an upward, concave, bow relative to the first surface 12. The method can further include locating the upward bow 98 in the piece of raw steel stock 10A, which can be done by visual inspection. Generally speaking, the thinner the piece of raw steel stock 10A is, the greater the likelihood of the existence of a bow 98. For example, a piece of raw steel stock 10A greater than 3 inches in height (thickness) will likely not have a bow 98. However, a piece of raw steel stock 10A about ½ inch in height (thickness) will likely have an upward bow 98. As illustrated in FIGS. 12A and 12B, the method can further include arranging an additional solid pole extension 82e between the top surface 76 and where the upward bow 98 in the piece of raw steel stock 10A will be supported for milling. As the area 90 corresponds to the perimeter 22 of second surface 14 of the piece of raw steel stock 10, element 90a corresponds to the location of the upward bow 98. The method is otherwise the same as that described above, with the multiple mobile pole extensions 86 being arranged, the second surface 14 of the piece of raw steel stock 10A being placed on the mobile pole extensions 86 and the solid pole extensions 82a-82e, the magnetic capabilities of the magnetic chuck 74 being activated, and the first surface 12 being ground.

The method can further include removing the piece of raw steel stock 10 (or 10A) after the milling of the first surface 12 thereof. The method described above can then be completed again to mill the second surface 14 of the piece of raw steel stock 10 (or 10A). In other words, the method can further include determining where on the top surface 76 of the magnetic chuck 74 the first surface 12 of the piece of raw steel stock 10 (or 10A) will be supported for milling of the second surface 14 of the piece of raw steel stock 10 (or 10A). This concept was described above in connection with FIG. 5. Because the perimeter 48 of the first surface 12 and the perimeter 22 of the second surface 14 are essentially the same in the illustrated example, area 90 on the top surface 76 of the magnetic chuck 74 can also correspond to perimeter 48 of the first surface 12. It should be understood, however, that if the perimeter 48 of the first surface 12 was larger, smaller, or otherwise significantly different than the perimeter 22 of the second surface 14, then a different area 90 would correspond to the perimeter 48.

The method further includes arranging a minimum of four solid pole extensions 82a-82d between the top surface 76 and where the first surface 12 of the piece of raw steel stock 10 (or 10A) will be supported for milling of the second surface 14 thereof such that the solid pole extensions 82a-82d are relatively evenly distributed around the area 90 corresponding to the perimeter 48 of the first surface 12 of the piece of raw steel stock 10 (or 10A) and within 2 inches of the perimeter 48. If a separate upward bow (not illustrated) is present, solid pole extension 82e will be arranged to support the bow. The arranging of the minimum of four solid pole extensions 82a-82d can be done in the manner described above in connection with FIG. 6 for the milling of the first surface 12. It should be understood however, that if the perimeter 48 of the first surface 12 was larger, smaller, or otherwise significantly different than the perimeter 22 of the second surface 14, then a different area 90 would correspond to the perimeter 48, and the minimum of four solid pole extensions 82a-82d would possibly be positioned at different top surface segments 80 than that described in connection with FIG. 6.

The method further includes arranging multiple mobile pole extensions 86 between the top surface 76 and where the first surface 12 of the piece of raw steel stock 10 (or 10A) will be supported for milling. The arranging of the multiple mobile pole extensions 86 can be done in the manner described above in connection with FIG. 7 for milling of the first surface 12, such as to occupy every available top surface segment 80 within the area 90 not occupied by the solid pole extensions 82a-82d (and 82e, if an upward bow 98 is present).

The method further includes placing the first surface 12 of the piece of raw steel stock 10 (or 10A) onto the multiple mobile pole extensions 86 and the solid pole extensions 82a-82d (and 82e if an upward bow 98 is present), activating the magnetic capabilities of the magnetic chuck 74, and then milling the second surface 14 of the piece of raw steel stock 10 (or 10A) to a desired flatness. These actions can be performed in the manner described above in connection with FIGS. 8 and 9 for milling of the first surface 12. Like the first surface 12, the milling element 92 can mill the second surface 14 of the piece of raw steel stock 10 (or 10A) until the second surface 14 has an arithmetic mean surface roughness of 21 micrometers or less and to a flat surface within a tolerance of 0.001 inch per 36 inches, and parallel to the first surface 12. It should be understood that an arithmetic mean surface roughness of 21 micrometers or less need not be achieved in one milling session. For example, the first surface 12 may be milled according to the methods described herein to an arithmetic mean surface roughness of greater than 21 micrometers, the piece of raw steel stock 10 (or 10A) removed and flipped over, the second surface 14 milled to an arithmetic mean surface roughness of greater than 21 micrometers, the piece of raw steel stock 10 (or 10A) again removed and flipped over, the first surface 12 milled to an arithmetic mean surface roughness of 21 micrometers or less, the piece of raw steel stock 10 (or 10A) again removed and flipped over, and the second surface 14 milled to an arithmetic mean surface roughness of 21 micrometers or less. The milling and flipping concept can be repeated as many times as desired until the desired arithmetic mean surface roughness is achieved.

Figure 13:
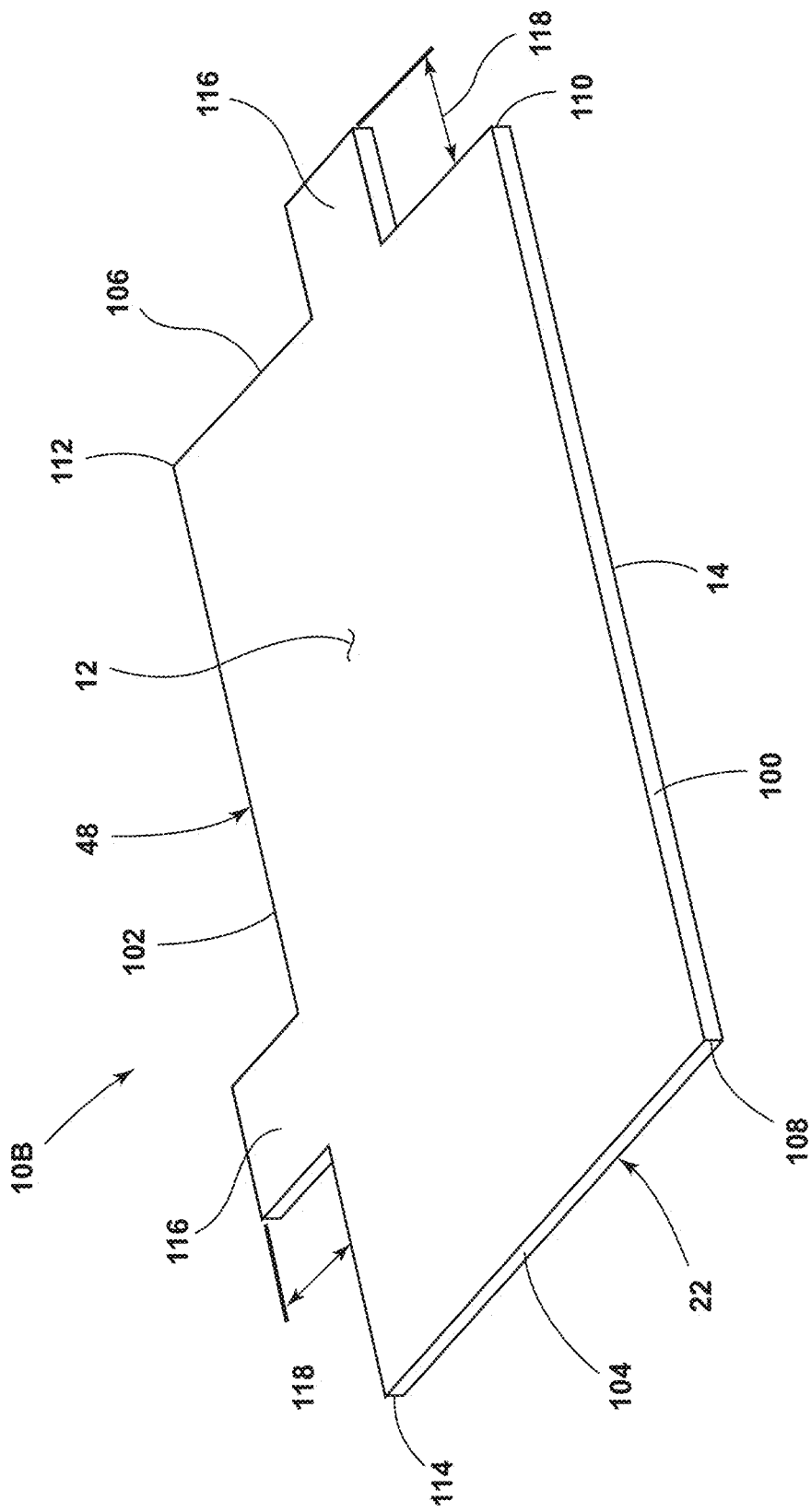
FIG. 13 is a perspective view of another piece of raw steel stock, similar to the piece of raw steel stock of FIGS. 1A and 1B, but further including protrusions (tabs) extending from a lengthwise side and a widthwise side.
Figure 14:
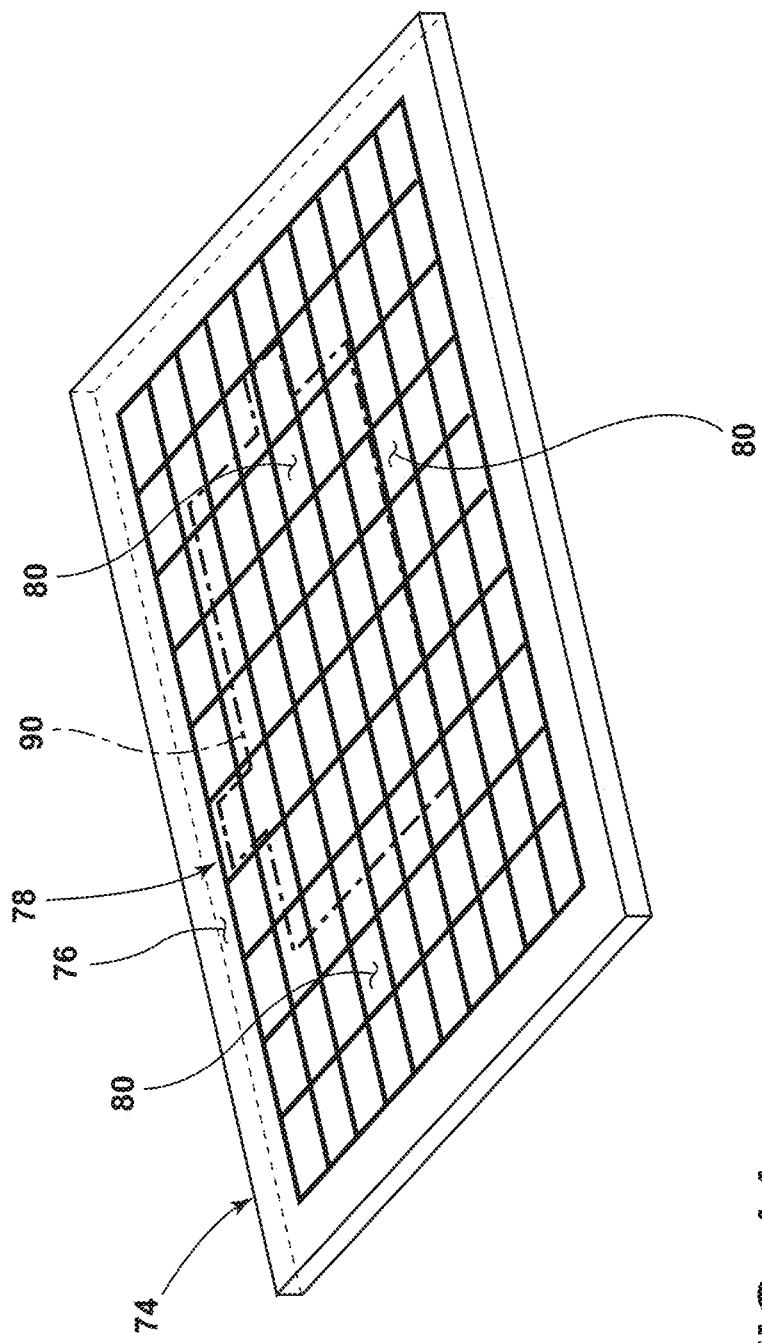
FIG. 14 is a perspective view of the magnetic chuck of FIG. 2, illustrating an area corresponding to where a perimeter of a second surface of the piece of raw steel stock of FIG. 13 will be supported for milling of a first surface thereof.

Referring now to FIG. 13, another piece of raw steel stock 10B, similar to the piece of raw steel stock 10, includes a first surface 12 and a second surface 14. The piece of raw steel stock 10B further includes lengthwise sides 100, 102, widthwise sides 104, 106, four primary corners 108, 110, 112, 114, and several protrusions 116 (tabs) at least five inches of length 118 along the widthwise side 106 and lengthwise side 102, respectively. The piece of raw steel stock 10B further includes a perimeter 22 defined by the second surface 14 and the perimeter 48 defined by the first surface 12. Described herein is a novel method of milling, with the magnetic chuck 74, the piece of raw steel stock 10B with at least one protrusion 116 at least 5 inches in length 118 (such as protrusions 116). As before, the method includes determining where on the top surface 76 of the magnetic chuck 74 the second surface 14 of the piece of raw steel stock 10B will be supported for milling of the first surface 12 of the piece of raw steel stock 10B. Referring now to FIG. 14, the area 90 on the top surface 76 of the magnetic chuck 74, corresponding to the perimeter 22 of the second surface 14 of the piece of raw steel stock 10B, is identified and determined as where the second surface 14 of the piece of raw steel stock 10B will be supported for milling of the first surface 12 of the piece of raw steel stock 10B.

Figure 15:
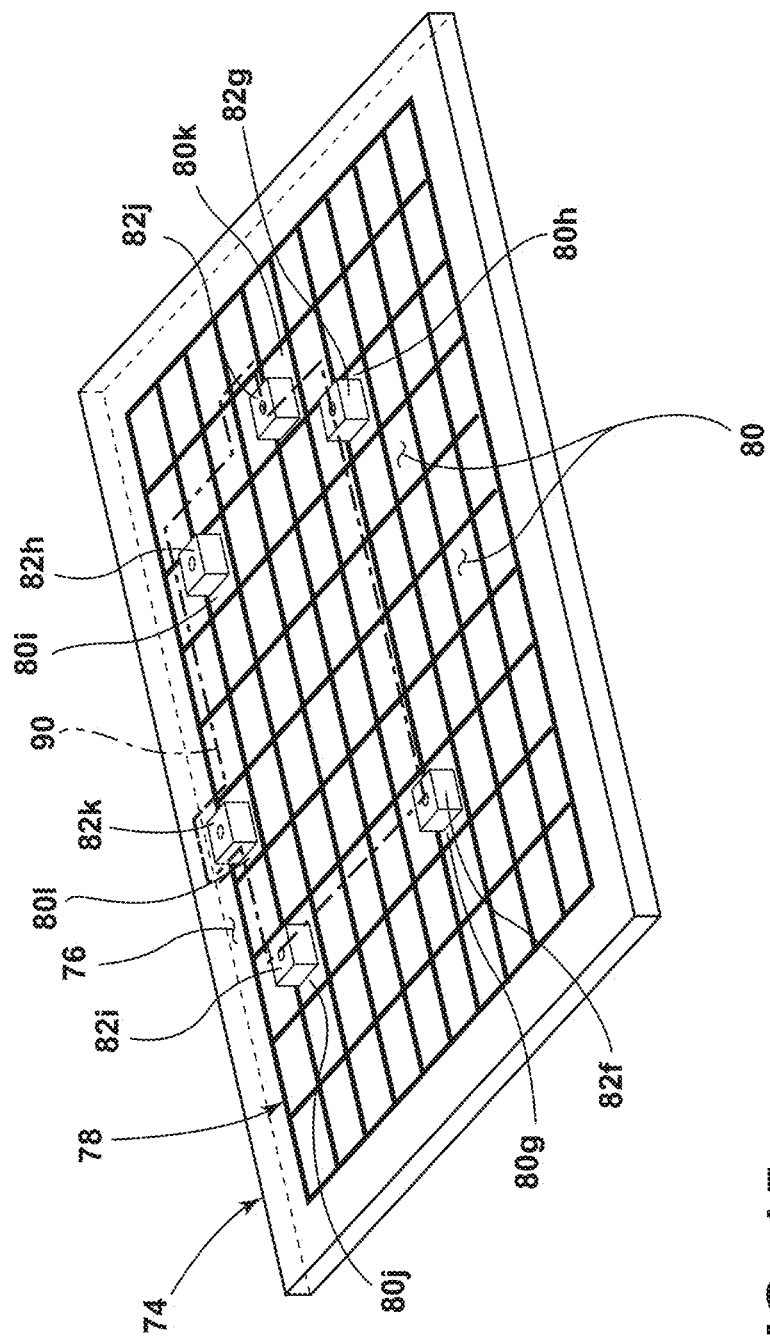
FIG. 15 is a perspective view of FIG. 14, further illustrating solid pole extensions arranged to support the perimeter of the second surface of the piece of raw steel stock of FIG. 13 and solid pole extensions arranged to support each of the protrusions thereof.

The method further includes arranging a minimum of four solid pole extensions 82 between the top surface 76 and where the second surface 14 of the piece of raw steel stock 10B will be supported for milling of the first surface 12 thereof such that the solid pole extensions 82f-82i will be relatively evenly distributed beneath a perimeter 22 of the second surface 14 of the piece of raw steel stock 10B and within 2 inches of the perimeter 22 and solid pole extensions 82j and 82k will be disposed under each of the at least one protrusions 116 to support the protrusions 116 during milling. Referring now to FIG. 15, the area 90 of the top surface 76 corresponding to the perimeter 22 of the second surface 14 of the piece of raw steel stock 10B is illustrated. Four solid pole extensions 82f-82i are placed on top surface segments 80g-80j respectively of the magnetic chuck 74. The four solid pole extensions 82f-82i are placed at top surface segments 80g-80j that will support the perimeter 22 of the second surface 14 of the piece of the raw steel stock 10B, as indicated by area 90. The four solid pole extensions 82f-82i are relatively evenly distributed around the area 90 to support the perimeter 22 of the second surface 14 of the piece of the raw steel stock 10B, with solid pole extensions 82f-82i being placed to support approximately the corners 108, 110, 112, and 114 of the piece of raw steel stock 10B, such as at top surface segments 80g, 80h, 80i, and 80j, respectively, of the magnetic chuck 74. Solid pole extensions 82j and 82k are additionally placed at top surface segments 80k and 80l to support the protrusions 116 of the piece of raw steel stock 10B.

Figure 16:
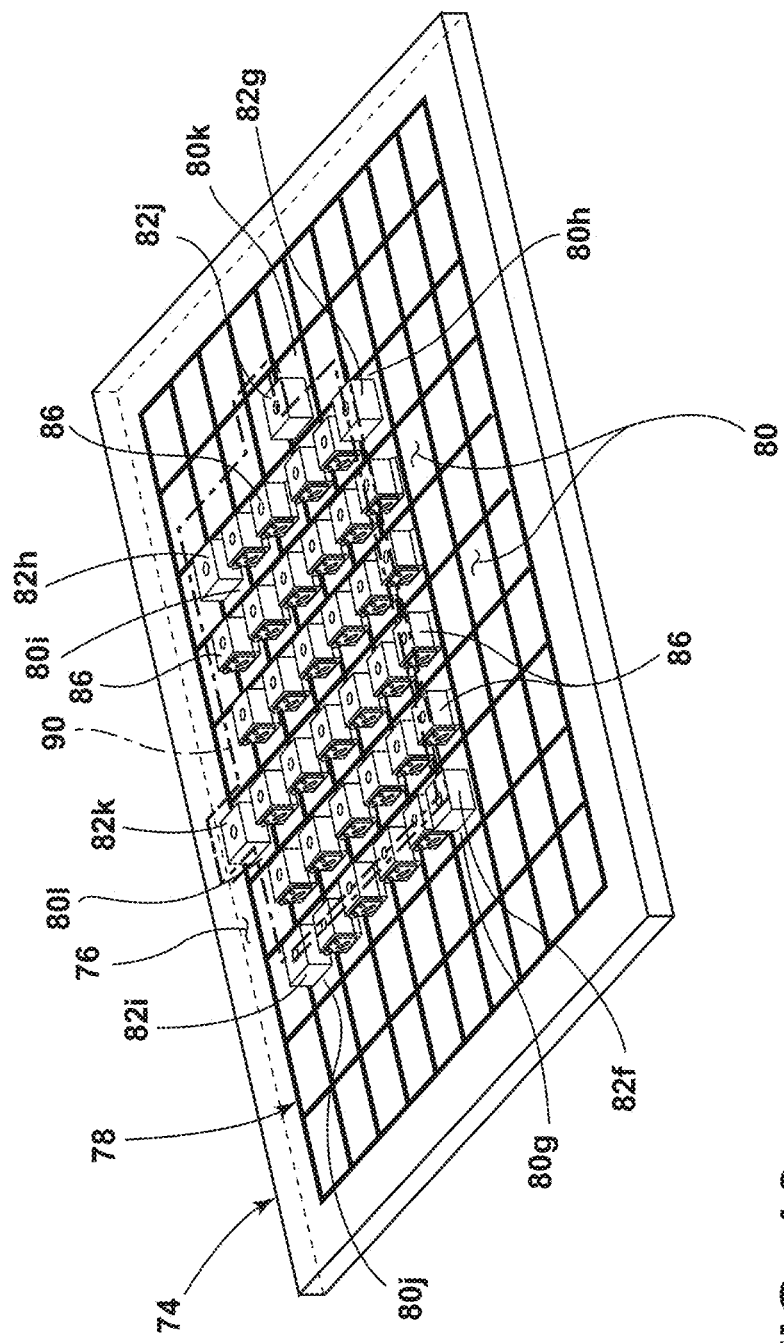
FIG. 16 is a perspective view of FIG. 15, further illustrating mobile pole extensions arranged within the area to support the second surface of the piece of raw steel stock of FIG. 13 for milling the first surface thereof.

The method further includes arranging multiple mobile pole extensions 86 between the top surface 76 and where the second surface 14 of the piece of raw steel stock 10B will be supported for milling of the first surface 12 (i.e., area 90). Referring now to FIG. 16, mobile pole extensions 86 are positioned on top surface segments 80 of the magnetic chuck 74. Every top surface segment 80 within the area 90 corresponding to the perimeter 22 of the second surface 14 that is not occupied by the solid pole extensions 82f-82k can be occupied by a mobile pole extension 86, as illustrated.

The method further includes placing the second surface 14 of the piece of raw steel stock 10B onto the multiple mobile pole extensions 86 and the solid pole extensions 82, activating the magnetic capabilities of the magnetic chuck 74, and milling the first surface 12 of the piece of raw steel stock 10B to a desired flatness. These actions can be performed in the manner described above for the piece of the raw steel stock 10. As before, the first surface 12 of the piece of raw steel stock 10B can be milled with the milling element 92 (such as a face mill) that includes a carbide cutting insert 96, including a face mill milling element 92 that includes only one carbide cutting insert 96. The milling element 92 can mill the first surface 12 of the piece of raw steel stock 10B until the first surface 12 has an arithmetic mean surface roughness ("Ra") of 21 micrometers or less. Further, the milling element 92 can grind the first surface 12 of the piece of raw steel stock 10B to a flat surface within a tolerance of 0.001 inch per 36 inches.

The method can further include locating a bow (not illustrated) in the piece of raw steel stock 10B and arranging an additional solid pole extension 82 between the top surface 76 and where the bow in the piece of the raw steel stock 10B will be supported for milling. These actions can be performed in the manner described above in reference to FIGS. 11 through 12B with the bow 98 present in the piece of raw steel stock 10A.

The method can further include removing the piece of raw steel stock 10B after the milling of the first surface 12 thereof and repeating the actions described above to mill the second surface 14 of the piece of raw steel stock 10B. More particularly, those actions include: determining where on the top surface 76 of the magnetic chuck 74 the first surface 12 of the piece of raw steel stock 10B will be supported for milling of the second surface 14 thereof; arranging a minimum of four solid pole extensions 82 between the top surface 76 and where the first surface 12 of the piece of raw steel stock 10B will be supported for milling of the second surface 14 thereof such that the solid pole extensions 82 are relatively evenly distributed around the area 90 corresponding to the perimeter 48 of the first surface 12 of the piece of raw steel stock 10B and within 2 inches of the perimeter 48 and at least one solid pole extension 82 will be disposed under each of the at least one protrusion 116; arranging multiple mobile pole extensions 86 between the top surface 76 and where the first surface 12 of the piece of raw steel stock 10B will be supported for milling; placing the first surface 12 of the piece of raw steel stock 10B onto the multiple mobile pole extensions 86 and the solid pole extensions 82; activating the magnetic capabilities of the magnetic chuck 74; and milling the second surface 14 of the piece of raw steel stock 10B to a desired flatness. As before, the second surface 14 can be milled to an arithmetic mean surface roughness of 21 micrometers or less and to a flat surface, parallel with the first surface 12, within a tolerance of 0.001 inch per 36 inches.

Figure 17:
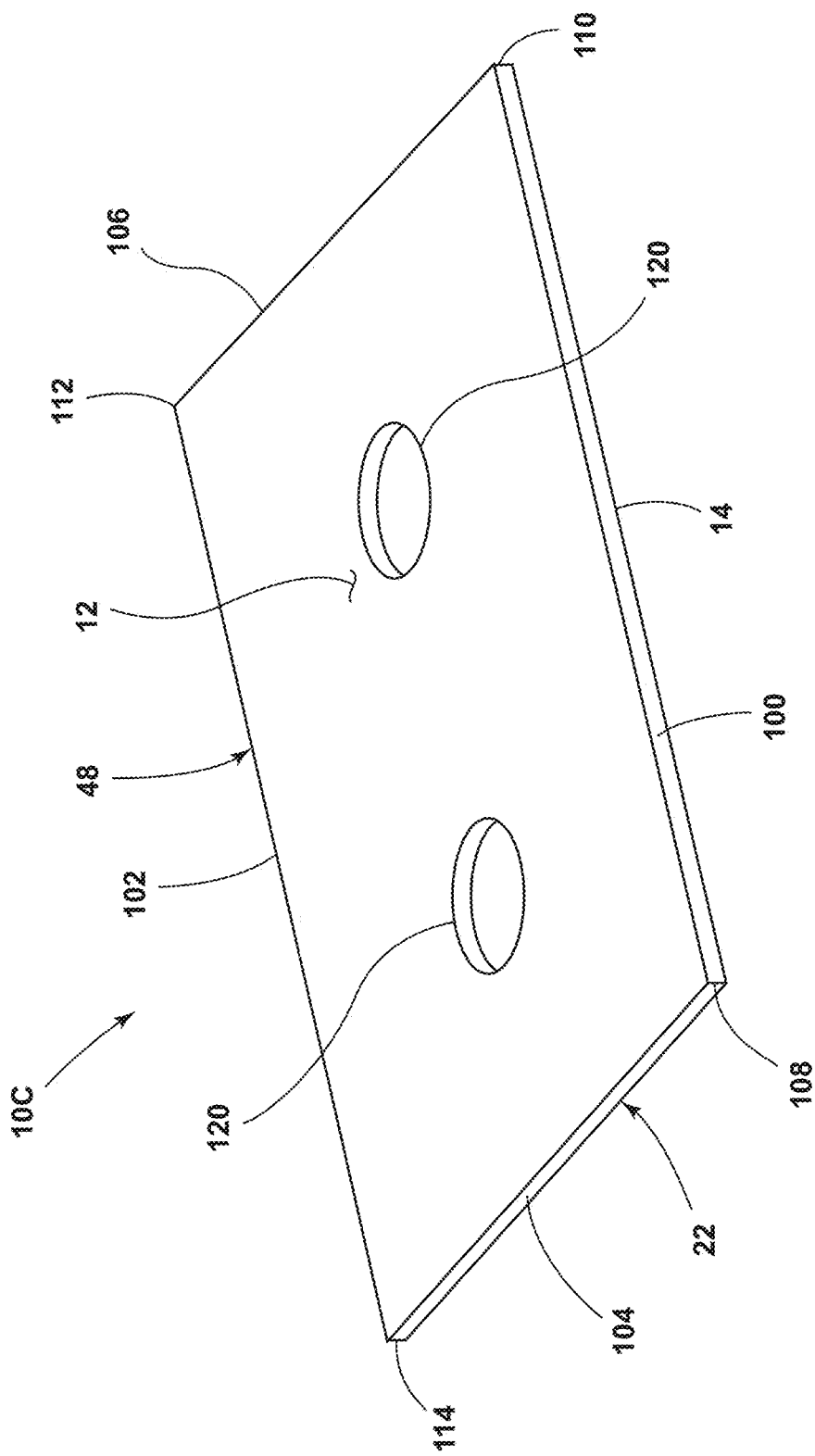
FIG. 17 is a perspective view of another piece of raw steel stock, otherwise identical to the piece of raw steel stock of FIGS. 1A and 1B, but including a pair of holes extending from a first surface through to a second surface.

Referring to FIG. 17, another piece of raw steel stock 10C, which is otherwise identical to the piece of raw steel stock 10 of FIG. 1, includes a pair of holes 120 extending through the piece of raw steel stock from the first surface 12 through to the second surface 14. The second surface 14 of the piece of raw steel stock 10C defines the perimeter 22. The first surface 12 defines the perimeter 48. The piece of raw steel stock 10C includes the four sides 100, 102, 104, and 106 forming the four corners 108, 110, 112, and 114.

Figure 18:
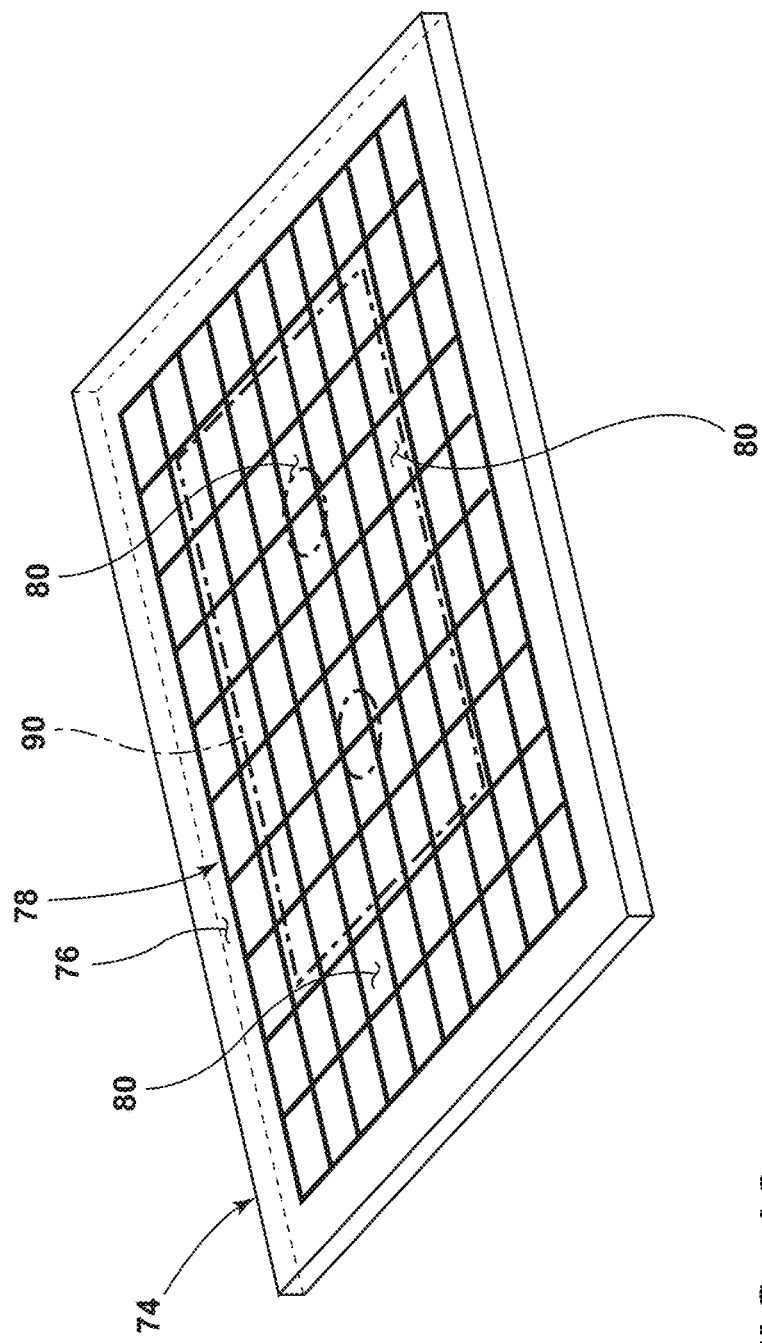
FIG. 18 is a perspective view of the magnetic chuck of FIG. 2, illustrating an area on the top surface thereof where the second surface of the piece of raw steel stock of FIG. 17 will be supported for milling of the first surface thereof.

Further described herein is a novel method of milling the piece of raw steel stock 10C into a machine-ready piece of steel using the magnetic chuck 74 and a milling element 92. The method includes determining where on the top surface 76 of the magnetic chuck 74 the second surface 14 of the piece of raw steel stock 10C will be supported for milling of the first surface 12 thereof. Referring now to FIG. 18, the area 90 on the top surface of 76 the magnetic chuck 74 corresponding to the perimeter 22 of the second surface 14 of the piece of raw steel stock 10C is identified and determined as where the second surface 14 of the piece of raw steel stock 10C will be supported for milling of the first surface 12 of the piece of raw steel stock 10C.

Figure 19:
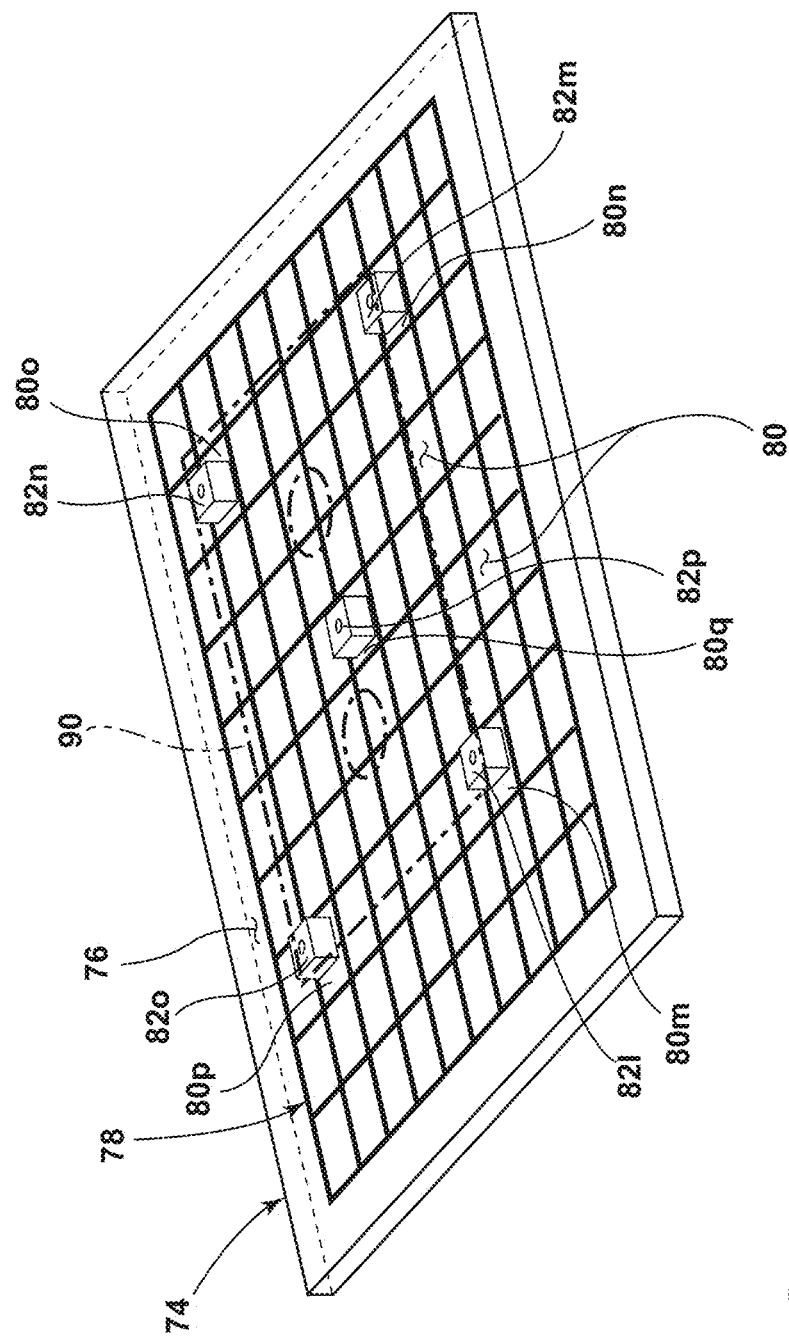
FIG. 19 is a perspective view of FIG. 18 further illustrating solid pole extensions arranged to relatively evenly support the perimeter of the second surface of the piece of raw steel stock of FIG. 17 and a solid pole extension to support the second surface between the pair of holes.

The method further includes arranging a minimum of four solid pole extensions 82*l*-82*o* between the top surface 76 and where the second surface 14 of the piece of raw steel stock 10C will be supported for milling of the first surface 12 thereof such that the solid pole extensions 82*l*-82*o* will be relatively evenly distributed under a perimeter 22 of the second surface 14 of the piece of raw steel stock 10C and within 2 inches of the perimeter 22 and at least one solid pole extension 82*p* will be disposed between the at least two holes 120. Referring now to FIG. 19, the area 90 of the top surface 76 of the magnetic chuck 74 corresponding to the perimeter 22 of the second surface 14 of the piece of raw steel stock 10C is illustrated. Four solid pole extensions 82*l*-82*o* are placed on top surface segments 80*m*-80*p* respectively of the magnetic chuck 74. The four solid pole extensions 82*l*-82*o* are placed at the top surface segments 80*m*-80*p* that overlap with the perimeter 22 of the second surface 14 of the piece of the raw steel stock 10C. The four solid pole extensions 82*l*-82*o* are relatively evenly distributed around area 90 to support the perimeter 22 of the second surface 14 of the piece of the raw steel stock 10C, with solid pole extensions 82*l*-82*o* being placed at top surface segments 80*m*-80*p* of the magnetic chuck 74 to support the corners 108, 110, 112, and 114 of the piece of raw steel stock 10C. A solid pole extension 82*p* is additionally placed at top surface segment 80*q* of the magnetic chuck 74 to support the second surface 14 of the piece of raw steel stock 10C between the two holes 120. The piece of raw steel stock 10C is more susceptible to bowing between the holes 120, and the solid pole extension 82*p* helps counteract this susceptibility.

Figure 20:
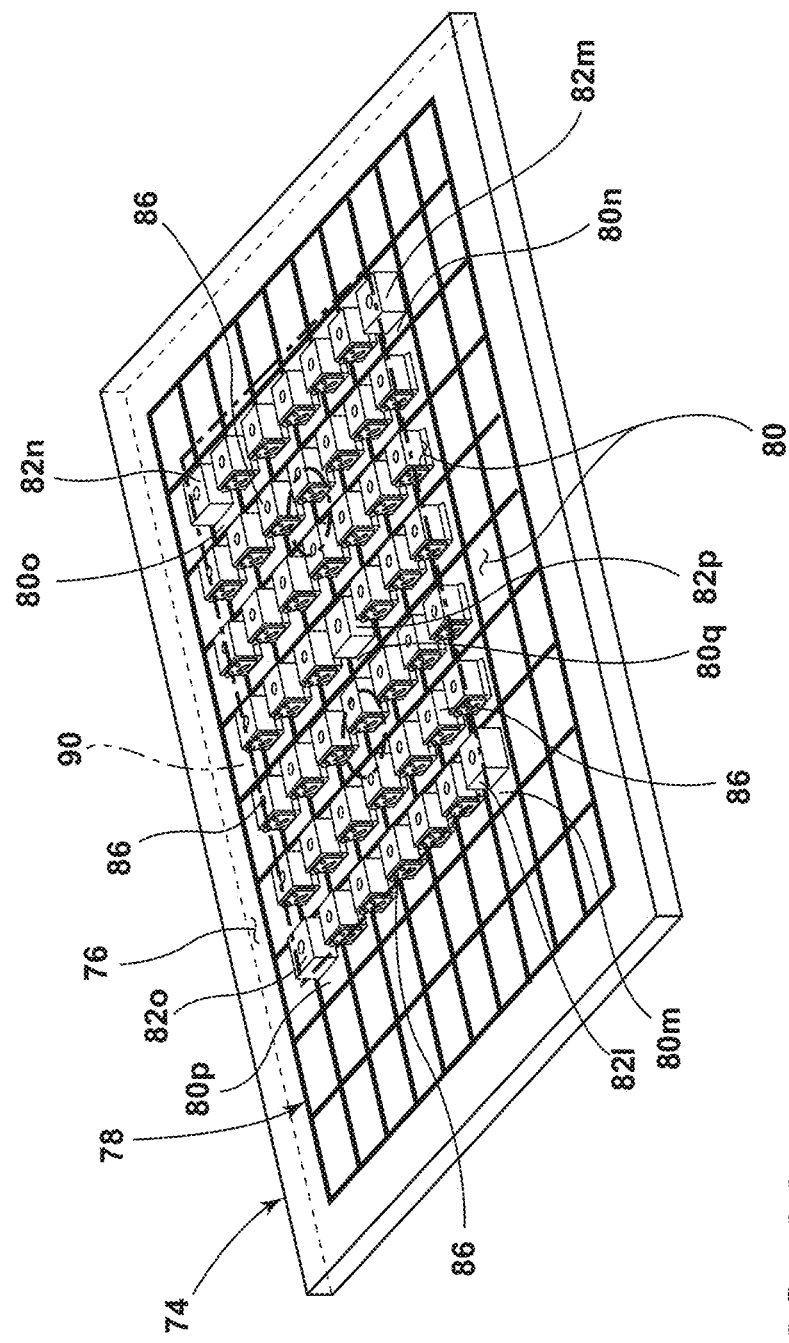
FIG. 20 is a perspective view of FIG. 19 further illustrating mobile pole extensions arranged within the area to support the second surface of the piece of raw steel stock of FIG. 13 for milling the first surface thereof.

The method further includes arranging multiple mobile pole extensions 86 between the top surface 76 and where the second surface 14 of the piece of raw steel stock 10C will be supported for milling. Referring now to FIG. 20, mobile pole extensions 86 are positioned on top surface segments 80 of the magnetic chuck 74 within the area 90 and not occupied by solid pole extensions 82*l*-82*p*. The area 90 of the top surface 76 of the magnetic chuck 74 corresponding to where the perimeter 22 of the second surface 14 of the piece of raw steel stock 10C is illustrated. Every top surface segment 80 within the area 90 that is not occupied by solid pole extensions 82 and 82*l*-82*p* can be occupied by a mobile pole extension 86, as illustrated.

The method further includes placing the second surface 14 of the piece of raw steel stock 10C onto the multiple mobile pole extensions 86 and the solid pole extensions 82*l*-82*p*, activating the magnetic capabilities of the magnetic chuck 74, and milling the first surface 12 of the piece of raw steel stock 10C to a desired flatness. These actions can be performed in the manner described above for the piece of the raw steel stock 10 (and 10A, 10B). As before, the first surface 12 of the piece of raw steel stock 10C can be ground with a milling element 92 (such as a face mill) that includes a carbide cutting insert 96, including a face mill milling element 92 that includes only one carbide cutting insert 96. The milling element 92 can mill the first surface 12 of the piece of raw steel stock 10C until the first surface 12 has an arithmetic mean surface roughness ("Ra") of 21 micrometers or less. Further, the milling element 92 can mill the first surface 12 of the piece of raw steel stock 10C to a flat surface within a tolerance of 0.001 inch per 36 inches.

The method can further include locating a bow (not illustrated) in the piece of raw steel stock 10C and arranging an additional solid pole extension 82 between the top surface 76 and where the bow in the piece of the raw steel stock 10C will be supported for milling. These actions can be performed in the manner described above in reference to FIGS. 11 through 12B with a bow 98 present in the piece of raw steel stock 10A.

The method can further include removing the piece of raw steel stock 10C after the milling of the first surface 12 thereof and repeating the actions described above to mill the second surface 14 of the piece of raw steel stock 10C. More particularly, those actions include: determining where on the top surface 76 of the magnetic chuck 74 the first surface 12 of the piece of raw steel stock 10C will be supported for milling of the second surface 14 thereof; arranging a minimum of four solid pole extensions 82 between the top surface 76 and where the first surface 12 of the piece of raw steel stock 10C will be supported for milling of the second surface 14 thereof such that the solid pole extensions 82 are relatively evenly distributed around the area 90 corresponding to the perimeter 48 of the first surface 12 of the piece of raw steel stock 10C and within 2 inches of the perimeter 48 and at least one solid pole extension 82p disposed between the two holes 120; arranging multiple mobile pole extensions 86 between the top surface 76 and where the first surface 12 of the piece of raw steel stock 10C will be supported for milling; placing the first surface 12 of the piece of raw steel stock 10C onto the multiple mobile pole extensions 86 and the solid pole extensions 82l-82p; activating the magnetic capabilities of the magnetic chuck 74; and milling the second surface 14 of the piece of raw steel stock 10C to a desired flatness. As before, the second surface 14 can be milled to an arithmetic mean surface roughness of 21 micrometers or less and to a flat surface, parallel with the first surface 12, within a tolerance of 0.001 inch per 36 inches.

In embodiments, milling of the first surface 12 of the piece of raw steel stock 10, 10A, 10B, 10C includes only one cutting insert 96 removing up to 0.250" (such as between 0.150" and 0.250") before the piece of raw steel stock 10 is removed and flipped to mill the second surface 14 of the piece of raw steel stock 10, 10A, 10B, 10C. The use of the one cutting insert 96 during milling does not generate friction that is sufficient to cause thermal distortion of the piece of raw steel stock 10, 10A, 10B, 10C. After milling one of the first surface 12 and the second surface 14, the method in embodiments further comprises flipping the piece of raw steel stock 10, 10A, 10B, 10C, over and milling the other of the first surface 12 and the second surface 14 with the milling element 92 that holds only one cutting insert 96. In embodiments, the method includes continuing to flip the piece of raw steel stock 10, 10A, 10B, 10C, over and milling whichever of the first surface 12 and the second surface 14 is available for milling until both the first surface 12 and the second surface 14 have an arithmetic mean surface roughness ("Ra") of 21 micrometers or less, and the first surface 12 and the second surface 14 are parallel to within a tolerance of at least of 0.001 inch per 36 inches. In embodiments, the method includes milling of the first surface 12 and the second surface 14 in sequence only 1 to 3 times to achieve: (a) an arithmetic mean surface roughness ("Ra") of 21 micrometers or less at both the first surface 12 and the second surface 14; and (b) parallelism between the first surface 12 and the second surface 14 within a tolerance of at least 0.001 inch per 36 inches.

The milling of the first surface 12 and the second surface 14 generates only a steel chip as swarf 122, which can be fully recycled 124 and does not include coolant. In embodiments, the method further comprises recycling the swarf 122, which contains just steel chip.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method of milling a piece of raw steel stock comprising
    arranging a minimum of four solid pole extensions on top surface segments of a magnetic chuck such that the solid pole extensions are relatively evenly distributed under a piece of raw steel stock and within 2 inches of a perimeter of the piece of raw steel stock;
        the piece of raw steel stock having a length of at least 36 inches, a width of at least 36 inches, and a thickness of at least ½ inch, and a first surface and a second surface that are approximately flat and parallel;
    arranging multiple mobile pole extensions beneath the piece of raw steel stock and on every other top surface segment of the magnetic chuck under the piece of raw steel stock that is not occupied by the solid pole extensions but beneath the piece of raw steel stock, each of the multiple mobile pole extensions having a biased top portion that contacts the piece of raw steel stock;
    activating magnetic capabilities of the magnetic chuck such that the top portion of each of the mobile pole extensions locks into place supporting the piece of raw steel stock; and
    milling the first surface of the piece of raw steel stock with a face mill that includes spaces to hold multiple cutting inserts but holds only one carbide cutting insert, the one carbide cutting insert generating swarf from the piece of raw steel stock that consists essentially of steel chip.

2. The method of claim 1 further comprising:
    flipping the piece of raw steel stock over and milling the second surface of the piece of raw steel stock with the face mill that holds only the one carbide cutting insert; and
    continuing flipping the piece of raw steel stock over and milling whichever of the first surface and the second surface of the piece of the raw steel stock is available for milling until both the first surface and the second surface have an arithmetic mean surface roughness ("Ra") of 21 micrometers or less, and the first surface and the second surface are parallel to within a tolerance of at least of 0.001 inch per 36 inches.

3. The method of claim 1,
    milling of the piece of raw steel stock does not include the use of coolant, and the generated swarf does not comprise coolant.

4. The method of claim 1 further comprising:
    before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under an upward bow of the piece of raw steel stock.

5. The method of claim 1 further comprising:
before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under a protrusion at least five inches in length protruding from a side of the piece of raw steel stock.

6. The method of claim 5 further comprising:
before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under an upward bow of the piece of raw steel stock.

7. The method of claim 1 further comprising:
before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under the piece of raw steel stock between a pair of holes extending through the piece of raw steel stock.

8. The method of claim 7 further comprising:
before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under a protrusion at least five inches in length protruding from a side of the piece of raw steel stock.

9. The method of claim 8 further comprising:
before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under an upward bow of the piece of raw steel stock.

10. The method of claim 7 further comprising:
before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under an upward bow of the piece of raw steel stock.

11. A method of milling a piece of raw steel stock comprising:
arranging a minimum of four solid pole extensions on top surface segments of a magnetic chuck such that the solid pole extensions are relatively evenly distributed under a piece of raw steel stock and within 2 inches of a perimeter of the piece of raw steel stock;
the piece of raw steel stock having a length of at least 36 inches, a width of at least 36 inches, and a thickness of at least ½ inch, and a first surface and a second surface that are approximately flat and parallel;
arranging multiple mobile pole extensions beneath the piece of raw steel stock and on every other top surface segment of the magnetic chuck under the piece of raw steel stock that is not occupied by the solid pole extensions but beneath the piece of raw steel stock, each of the multiple mobile pole extensions having a biased top portion that contacts the piece of raw steel stock;
activating magnetic capabilities of the magnetic chuck such that the top portion of each of the mobile pole extensions locks into place supporting the piece of raw steel stock;
milling the first surface of the piece of raw steel stock with a face mill;
flipping the piece of raw steel stock over and milling the second surface of the piece of raw steel stock with the face mill; and
continuing flipping the piece of raw steel stock over and milling whichever of the first surface and the second surface of the piece of the raw steel stock is available for milling until both the first surface and the second surface have an arithmetic mean surface roughness ("Ra") of 21 micrometers or less, and the first surface and the second surface are parallel to within a tolerance of at least of 0.001 inch per 36 inches.

12. The method of claim 11 further comprising:
recycling swarf consisting of steel chip generated while milling the piece of raw steel stock.

13. The method of claim 11,
milling of the piece of raw steel stock does not include the use of coolant, and swarf generated from the milling does not comprise coolant.

14. The method of claim 11 further comprising:
before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under an upward bow of the piece of raw steel stock.

15. The method of claim 11 further comprising:
before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under a protrusion at least five inches in length protruding from a side of the piece of raw steel stock.

16. The method of claim 15 further comprising:
before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under an upward bow of the piece of raw steel stock.

17. The method of claim 11 further comprising:
before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under the piece of raw steel stock between a pair of holes extending through the piece of raw steel stock.

18. The method of claim 17 further comprising:
before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under a protrusion at least five inches in length protruding from a side of the piece of raw steel stock.

19. The method of claim 18 further comprising:
before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under an upward bow of the piece of raw steel stock.

20. The method of claim 17 further comprising:
before arranging multiple mobile pole extensions beneath the piece of raw steel stock and on every other top surface segment of the magnetic chuck under the piece of raw steel stock that is not occupied by the solid pole extensions but beneath the piece of raw steel stock, arranging an additional solid pole extension on one of the top surface segments of the magnetic chuck such that the additional solid pole extension is disposed under an upward bow of the piece of raw steel stock.

21. A method of milling a piece of raw steel stock comprising:
arranging a minimum of four solid pole extensions on top surface segments of a magnetic chuck such that the solid pole extensions are distributed under either (i) centers of edges or (ii) corners of a piece of raw steel stock and within 2 inches of a perimeter of the piece of raw steel stock;
the piece of raw steel stock having a length of at least 36 inches, a width of at least 36 inches, and a thickness of at least ½ inch, the piece of raw steel stock comprising a first surface and a second surface;
arranging multiple mobile pole extensions beneath the piece of raw steel stock and on top surface segments of the magnetic chuck under the piece of raw steel stock, each of the multiple mobile pole extensions having a biased top portion that contacts the piece of raw steel stock;
activating magnetic capabilities of the magnetic chuck such that the top portion of each of the mobile pole extensions locks into place supporting the piece of raw steel stock; and
milling the first surface of the piece of raw steel stock with a face mill, generating swarf from the piece of raw steel stock that consists essentially of steel chip.

22. The method of claim 21, wherein
the face mill includes spaces to hold multiple cutting inserts but holds only one carbide cutting insert.

23. The method of claim 21 further comprising:
flipping the piece of raw steel stock over and milling the second surface of the piece of the raw steel stock;
wherein, after the milling of the first surface and the second surface, both the first surface and the second surface have an arithmetic mean surface roughness ("Ra") of 21 micrometers or less, and the first surface and the second surface are parallel to within a tolerance of at least of 0.001 inch per 36 inches.

* * * * *

UNITED STATES PATENT AND TRADEMARK OFFICE
CERTIFICATE OF CORRECTION

PATENT NO. : 11,207,739 B2  
APPLICATION NO. : 16/808861  
DATED : December 28, 2021  
INVENTOR(S) : Slater Page 1 of 1

It is certified that error appears in the above-identified patent and that said Letters Patent is hereby corrected as shown below:

In the Specification

Column 2, Line 27, delete "of" (2nd occurrence);

Column 3, Line 26, delete "of" (2nd occurrence);

Column 4, Line 60, "very" should be --every--;

Column 6, Line 62, "lock" should be --locks--;

Column 11, Line 64, "of 76" should be --76 of--;

Column 13, Line 57, delete "of" (2nd occurrence);

In the Claims

Column 14, Claim 1, Lines 11-12, after "comprising", insert --:--;

Column 14, Claim 2, Line 53, delete "of" (2nd occurrence);

Column 16, Claim 11, Line 33, delete "of" (2nd occurrence); and

Column 18, Claim 23, Line 41, delete "of" (2nd occurrence).

Signed and Sealed this  
Twelfth Day of April, 2022

Drew Hirshfeld  
*Performing the Functions and Duties of the  
Under Secretary of Commerce for Intellectual Property and  
Director of the United States Patent and Trademark Office*